(12) United States Patent
Peterson et al.

(10) Patent No.: US 11,176,666 B2
(45) Date of Patent: Nov. 16, 2021

(54) CUT-SURFACE DISPLAY OF TUBULAR STRUCTURES

(71) Applicant: Vida Diagnostics, Inc., Coralville, IA (US)

(72) Inventors: Samuel Peterson, Topanga, CA (US); Benj Thomas, Eden Prairie, MN (US); Juerg Tschirren, Iowa City, IA (US)

(73) Assignee: VIDA Diagnostics, Inc., Coralville, IA (US)

( * ) Notice: Subject to any disclaimer, the term of this patent is extended or adjusted under 35 U.S.C. 154(b) by 70 days.

(21) Appl. No.: 16/678,737

(22) Filed: Nov. 8, 2019

(65) Prior Publication Data

US 2020/0151874 A1  May 14, 2020

Related U.S. Application Data

(60) Provisional application No. 62/758,309, filed on Nov. 9, 2018.

(51) Int. Cl.
| | |
|---|---|
| *G06T 7/00* | (2017.01) |
| *G06T 11/00* | (2006.01) |
| *G06T 15/08* | (2011.01) |

(52) U.S. Cl.
CPC .......... *G06T 7/0012* (2013.01); *G06T 11/008* (2013.01); *G06T 15/08* (2013.01);
(Continued)

(58) Field of Classification Search
None
See application file for complete search history.

(56) References Cited

U.S. PATENT DOCUMENTS

| | | |
|---|---|---|
| 5,558,091 A | 9/1996 | Acker et al. |
| 6,380,732 B1 | 4/2002 | Gilboa |
| (Continued) | | |

FOREIGN PATENT DOCUMENTS

| | | |
|---|---|---|
| DE | 102005039657 A1 | 3/2007 |
| WO | 03007198 A2 | 1/2003 |
| (Continued) | | |

OTHER PUBLICATIONS

Auzinger et al., "Vessel Visualization using Curved Surface Reformation," IEEE Transactions on Visualization and Computer Graphics, vol. 19, No. 12, Dec. 1, 2013, pp. 2858-2867 (Year: 2013).*

(Continued)

*Primary Examiner* — Vu Le
*Assistant Examiner* — Courtney Joan Nelson
(74) *Attorney, Agent, or Firm* — Fredrikson & Byron, P.A.

(57) ABSTRACT

A method for visualizing a tubular object from a set of volumetric data may include the steps of: determining a viewing direction for the tubular object; selecting a constraint subset of the tubular object within the volumetric data; defining a cut-surface through the volumetric data and including the constraint subset of the tubular object within the volumetric data; and rendering an image based upon the determined viewing direction and the volumetric data of the tubular object along the intersection of the volumetric data and the defined cut-surface. Additionally or alternatively, the method may identify a plurality of bifurcations in the tubular object; assign a weighting factor to each identified bifurcation; determine a bifurcation normal vector associated with each bifurcation; determine a weighted average of the bifurcation normal vectors; and render an image of the volumetric data from a perspective parallel to the weighted average of the bifurcation normal vectors.

24 Claims, 23 Drawing Sheets

(52) U.S. Cl.
CPC ............... *G06T 2207/10081* (2013.01); *G06T 2207/10088* (2013.01); *G06T 2207/30061* (2013.01); *G06T 2207/30172* (2013.01)

(56) References Cited

U.S. PATENT DOCUMENTS

| | | | |
|---|---|---|---|
| 6,456,868 | B2 | 9/2002 | Saito et al. |
| 6,466,687 | B1 | 10/2002 | Uppaluri et al. |
| 6,466,815 | B1 | 10/2002 | Saito et al. |
| 6,558,333 | B2 | 5/2003 | Gilboa et al. |
| 6,580,938 | B1 | 6/2003 | Acker |
| 6,615,155 | B2 | 9/2003 | Gilboa |
| 6,711,429 | B1 | 3/2004 | Gilboa et al. |
| 6,775,404 | B1 | 8/2004 | Pagoulatos et al. |
| 6,807,292 | B1 | 10/2004 | Goto et al. |
| 7,233,820 | B2 | 6/2007 | Gilboa |
| 7,274,810 | B2 | 9/2007 | Reeves et al. |
| 7,338,452 | B2 * | 3/2008 | Shiina ............... A61B 5/02007 600/467 |
| 7,760,941 | B2 | 7/2010 | Bomemann et al. |
| 8,219,179 | B2 | 7/2012 | Ganatra et al. |
| 8,428,317 | B2 * | 4/2013 | Kimia ............... G06T 7/62 382/128 |
| 8,611,989 | B2 | 12/2013 | Roberts |
| 8,700,132 | B2 | 4/2014 | Ganatra et al. |
| 2003/0029464 | A1 | 2/2003 | Chen et al. |
| 2003/0108853 | A1 | 6/2003 | Chosack et al. |
| 2005/0182295 | A1 | 8/2005 | Soper et al. |
| 2005/0228250 | A1 | 10/2005 | Bitter et al. |
| 2005/0251017 | A1 | 11/2005 | Azar |
| 2005/0272971 | A1 | 12/2005 | Ohnishi et al. |
| 2006/0030958 | A1 | 2/2006 | Tschirren et al. |
| 2007/0053562 | A1 | 3/2007 | Reinhardt et al. |
| 2007/0078334 | A1 | 4/2007 | Scully et al. |
| 2007/0092864 | A1 | 4/2007 | Reinhardt et al. |
| 2007/0223794 | A1 | 9/2007 | Preiss et al. |
| 2007/0293721 | A1 | 12/2007 | Gilboa |
| 2008/0205722 | A1 * | 8/2008 | Schaefer ............... G06T 7/11 382/128 |
| 2017/0278301 | A1 * | 9/2017 | Peterson ............... G06T 19/00 |

FOREIGN PATENT DOCUMENTS

| | | |
|---|---|---|
| WO | 03086498 A2 | 10/2003 |
| WO | 2005119505 A2 | 12/2005 |
| WO | WO-2009103046 A2 * | 8/2009 ............... G06T 7/162 |

OTHER PUBLICATIONS

International Patent Application No. PCT/US2019/060407, International Search Report and Written Opinion dated Jul. 14, 2020, 22 pages.

Auzinger et al., "Vessel Visualization using Curved Surface Reformation," IEEE Transactions on Visualization and Computer Graphics, vol. 19, No. 12, Dec. 1, 2013, pp. 2858-2867.

Kanitsar et al., "Advanced Curved Planar Reformation," IEEE Visualization 2003, Seattle, Washington, Oct. 19-24, 2003, pp. 43-50.

Saroul et al., "Exploring curved anatomic structures with surface sections," IEEE Visualization 2003, Annual IEEE Conference on Visualization, New York, NY, Oct. 19, 2003, pp. 27-34.

Kanitsar, "Curved Planar Reformation for Vessel Visualization," Dissertation, 2004, 107 pages.

Saroul, "Surface Extraction and Flattening for Anatomical Visualization," Thesis No. 3575, University of Saint-Etienne, France, 2006, 135 pages.

Tschirren, Juerg, et al., "Matching and anatomical labeling of human airway tree", IEEE Transactions of Medical Imaging, pp. 1-8, 2005, work was supported in party by NIH grant HL-064368.

Tschirren, Juerg, et al., "Intrathoracic Airway Trees: Segmentation and Airway Morphology Analysis from Low-Dose CT Scans", IEEE Transactions on Medical Imaging, pp. 1-11, 2005, work was supported in part by NIH grant HL-064368.

Li, Kang, "Efficient Optimal Net Surface Detection for Image Segmentation—From Theory to Practice", Masters Thesis for University of Iowa, Dec. 2003.

Tschirren, Juerg, "Segmentation, Anatomical Labeling, Branchpoint Matching, and Quantitative Analysis of Human Airway Trees in Volumetric CT Images", Doctors Thesis for University of Iowa, Aug. 2003.

Tschirren, Juerg, "Segmentation, branchpoint matching, and anatomical labeling of human airway trees in volumetric CT images", Ph.D. Defense Presentation, University of Iowa, Jul. 10, 2003.

Leotta, Daniel F., "An Efficient calibration Method for Freehand 3-D Ultrasound Imaging Systems", May 13, 2004, pp. 999-1008, vol. 30, No. 7, Ultrasound in Medicine & Biology, (doi:10.1016/j.ultrasmedbio.2004.5.007).

Horn, Berthold K. P., "Closed-form solution of absolute orientation using unit quartemions", Journal of the Optical Society of America A, Apr. 1987, pp. 629-642, vol. 4.

* cited by examiner

CUT-SURFACE DISPLAY OF TUBULAR STRUCTURES

RELATED MATTERS

This application claims the benefit of U.S. Provisional Patent Application No. 62/758,309, filed Nov. 9, 2018. The entire content of this application is incorporated herein by reference.

FIELD OF INVENTION

The present invention generally relates to systems and methods to generate richly informative displays of lung airway trees and other complex anatomical structures.

BACKGROUND OF THE INVENTION

Visualization and interpretation of tubular anatomical structures embedded within a 3D medical image volume is often challenging due to their shape complexity and non-planar nature.

The overall topology of a tubular structure—especially one that exhibits branching—is usually best viewed in the form of a virtual model display, in which the user can see the whole object in a single display. However, this viewing paradigm is external and purely geometric and thus does not provide contextual information of interior composition and surrounding tissue. 2D planar cross-sections through the image volume (e.g., multi-planar reformats (MPRs)) are well suited for looking at composition and surrounding context but can only capture a small portion of a highly non-planar object in a single display. Yet another technique commonly used for such visualization is the maximum intensity projection (MIP) or minimum intensity projection (MinIP). These work well to generate a comprehensive view of a uniformly bright or dark object of interest (e.g. MIP in the case of a CT scan of dense structures and MinIP in the case of a CT scan of hollow structures), however data at the opposite end of the spectrum are completely filtered out, and thus critical contextual and compositional information are lost. As an alternative to MPR views, curved planar reformats (curved MPRs or CPRs) are widely used to render a length-wise cross-section along the entire length of a tubular structure (and limited number of branches) in a single view. A similar approach, known as a "filet view" is commonly used for large bowel visualization. However, the way in which such constructions must be stitched together (especially when the object is highly curved or branches out in multiple directions) can often be disorienting and the spatial context of what is being displayed can easily be lost. It is also difficult to formulate these types of views for complex branching structures. Because these and other visualization methods suffer from various limitations, it is desirable to find an alternative way to convey both shape and rich interior/contextual information for a tubular and/or branching structure of interest in a single, contiguous display. Previously proposed methods for defining and rendering a "free-form" surface in order to capture a branching structure in a contiguous manner (avoiding the "stitching" problem). However, the method described does not lend itself to highly complex branching structures such as lung airway trees.

Prior techniques can only be applied to structures that can be entirely covered by a single, continuous manifold. However, in the case of a complex structure, such as an airway tree, this is not practical, as excessive distortion would result.

SUMMARY

In general, various embodiments relating to systems and methods to generate richly informative displays of lung airway trees and other complex anatomical structures are disclosed herein. Such embodiments can be used in an exemplary application to help a physician or other user visualize a patient's lungs.

One embodiment includes a method for visualizing a tubular object of interest form a set of volumetric data. In this embodiment, the method includes the steps of: determining a viewing direction for the object of interest; selecting a constraint subset of the object within the volumetric data; defining a cut-surface through the volumetric data including the constraint subset of the object of interest within the volumetric data; and rendering an image based upon the determined viewing direction and the volumetric data of the tubular object along the intersection of the volumetric data and the defined cut-surface. Determining the viewing direction may further comprise implementing a predefined setting; receiving a selection of a viewing direction; or calculating an optimal viewing direction. Receiving a selection of a viewing direction may comprise providing a rotatable two-dimensional visualization and/or a rotatable three-dimensional visualization of the volumetric data and receiving a selected orientation based on a rotated position of the rotatable two-dimensional visualization and/or the rotatable three-dimensional visualization.

Another embodiment may include a method for visualizing a tubular object of interest from a set of volumetric data comprising the steps of: identifying a plurality of bifurcations in the tubular object; assigning a weighting factor to each of the identified bifurcations; determining a bifurcation normal vector associated with each of the plurality of bifurcations; determining a weighted average of the bifurcation normal vectors based on the weighting factors and determined bifurcation normal vectors for each of the plurality of identified bifurcations; and rendering an image of the volumetric data from a perspective parallel to the weighted average of the bifurcation normal vectors.

The details of one or more examples are set forth in the accompanying drawings and the description below. Other features, objects, and advantages will be apparent from the description and drawings, and from the claims.

BRIEF DESCRIPTION OF DRAWINGS

Advantages of the present invention may become apparent to those skilled in the art with the benefit of the following detailed description and upon reference to the accompanying drawings.

DETAILED DESCRIPTION

Aspects of this disclosure relate to systems and methods for producing displays of complex and/or branching anatomical structures from medical image data. "Cut-surface rendering" or "cut-surface display" combines the aspects of 3D geometric rendering with the notion of sampling along a continuous, curved surface. Embodiments can include generating a 3D curved planar surface (generally referred to herein as a "cut-surface") that carves through the image volume in a way that intersects a portion (e.g., a significant and/or interesting portion) of the overall volume and/or structure(s) of interest. Various implementations according to the instant disclosure can be used to generate richly informative displays of the lung airway tree and other complex anatomical structures.

Figure 1:
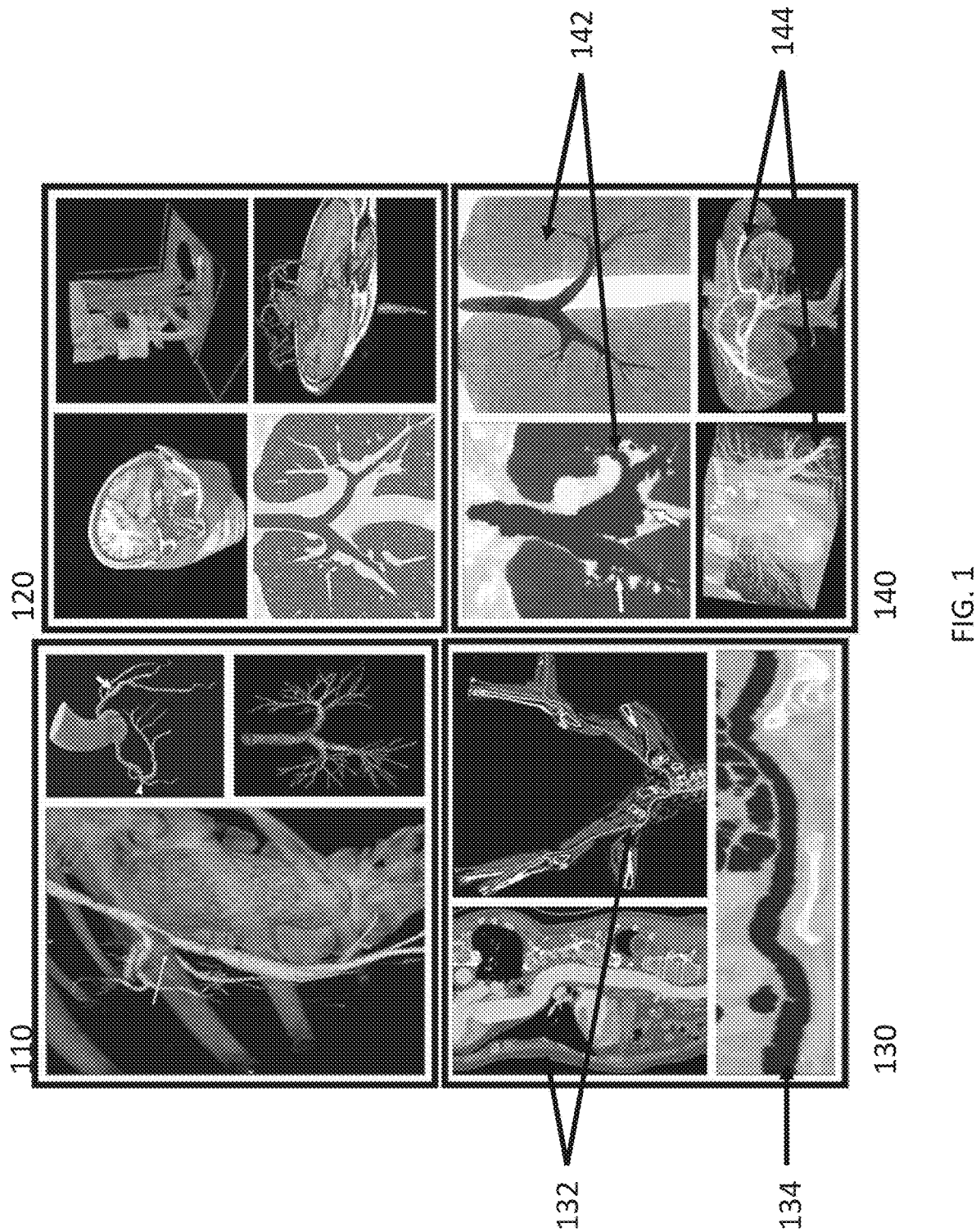
FIG. 1 shows various examples of displays of tubular structures.

FIG. 1 shows various examples of displays of tubular structures. Image 110 (upper-left) shows an exemplary 3-D display from an external viewpoint. Image 120 (upper-right) shows various planar cross-sectional displays (MPRs). Image 130 (lower-left) shows curved planar reformats for vascular structures 132 and colonic structures 134. Image 140 (lower-right) shows minimum intensity projections 142 (e.g. for airways) and maximum intensity projections 144 (e.g. for vessels).

In some embodiments according to the instant application, the point of view (e.g. point-of-view 212) for the display may be selected prior to cut-surface construction and/or the cut-surface is constructed based on a subset of the structure of interest (e.g. 216 or 222) and dependent upon the point-of-view that was chosen.

Figure 3:
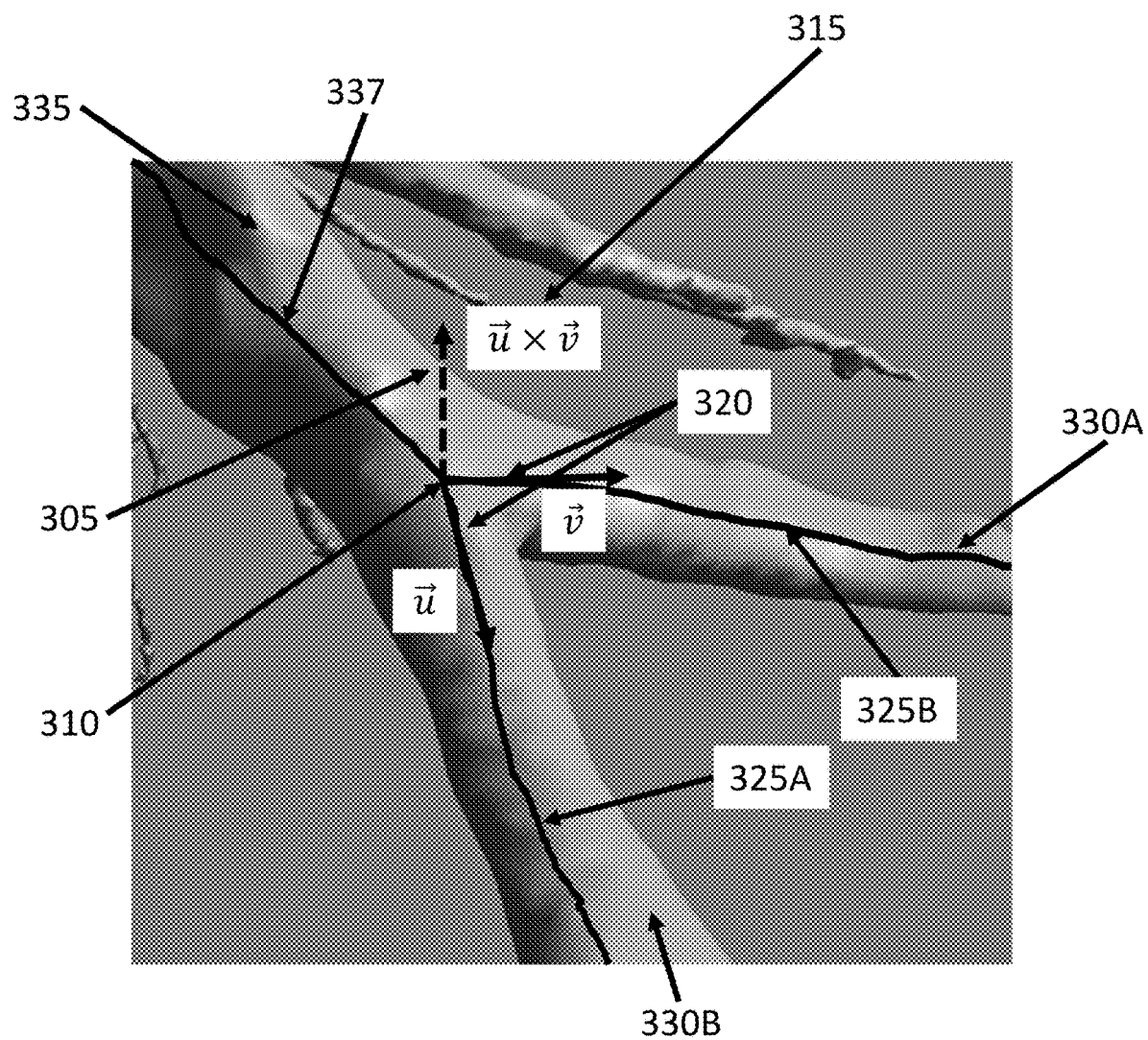
FIG. 3 shows a normal direction to a bifurcation plane computed as the cross product of the direction of two child branches.

Various techniques exist for image segmentation, as well as centerline computation (e.g., skeletonization). In some embodiments, a tubular object of interest is segmented from volumetric image data so that the voxels corresponding to the object of interest are delineated, and its medial axis (or "centerline") is computed. FIG. 3 shows an exemplary embodiment displaying the centerlines in black overlaid on a segmented branching airway structure 325. In some embodiments, systems and methods utilize volumetric image data from which an object of interest has already been segmented and/or in which a centerline has already been determined.

Figure 2:
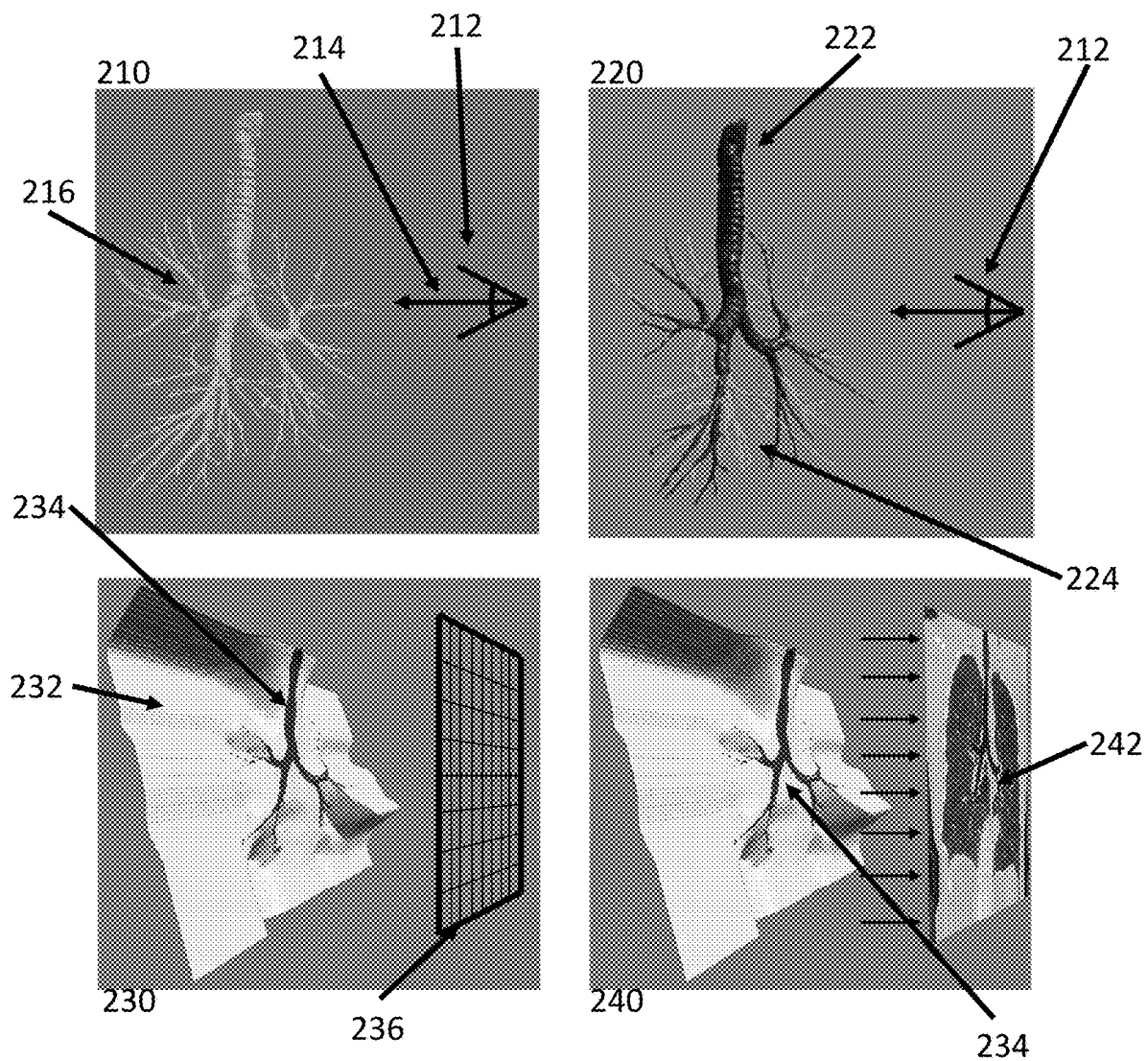
FIG. 2 shows an exemplary illustration of the basic pipeline of an exemplary embodiment implemented using an example airway tree structure.

In some embodiments, systems according to the instant application can be configured to perform the steps of: 1) determining a 3D viewing direction for an object of interest (e.g. view direction 214); 2) selecting a subset of the object to constrain the cut-surface construction (e.g. viewable subset 222); 3) defining the cut-surface throughout the remainder of the volume in a way that smoothly varies between the constraints (e.g. cut-surface 232); and 4) rendering the image formed along intersection of the image volume with the cut-surface, for example, via ray casting and trilinear interpolation, as shown in 240 of FIG. 2.

Various examples include displaying a lung airway tree from a Computed Tomography (CT) or Fluoroscopic Cone-beam CT scan, and thus the description that follows is phrased in terms of such an implementation by way of example. However, it will be appreciated that various processes described herein could be applied to other tubular structures (such as vessels, vascular trees or large/small bowel) and/or another volumetric imaging modality such as Magnetic Resonance Imaging (MM).

Viewpoint Selection

In various embodiments, when selecting a view direction for a three-dimensional structure, it can be desirable to have the object spread out as much as possible and with minimal overlap or obstruction in the resulting projection. In other words, it can be desirable that the variation between point locations on the object of interest be minimized along the view direction and maximized in a direction perpendicular to the view direction (parallel to the image plane). In some implementations, this is analogous to a 2D projection of object of interest to occupy a large area. In various embodiments, rendering a tree structure can be performed by choosing a display perspective from which the branches (e.g. branches 330) spread widely apart and do not block one another. This can be achieved, for example, by looking at any bifurcation point, such as bifurcation point 310. In some embodiments, this may be achieved by looking at the bifurcation points (e.g. bifurcation point 310) at which multiple child branches 330A and 330B may emanate from a single parent branch 335. The parent branch 335 may have a centerline 337 and the child branches may have centerlines 325A and 325B. On a per-branch basis, this view direction often coincides with the normal to the bifurcation plane 320, shown as normal vector 305, so that the projections of the two emanating branches spread apart from each other along the span of bifurcation plane 320. Given that the 3D vector directions of every pair of bifurcating branches (e.g. branches 330A and 330B) can be derived from the centerline of the tree (e.g. centerline 325A and 325B), the normal of the bifurcation plane 320 can be readily computed using the directional cross-product (directional cross product 315). FIG. 3 shows the normal vector 305 to the bifurcation plane 320 computed as the cross product 315 of the direction of the two child branches 330A and 330B.

FIG. 2 shows an exemplary illustration of the basic pipeline of an exemplary embodiment implemented using an example airway tree structure. In the upper-left image 210, The object of interest 216 is shown along with a determined point of view 212; In image 220, a selected subset 222 for rendering the structure of interest 216 is darkly shaded, while the portions omitted 224 (crossing in front of or behind the selected subset 222) is lightly shaded. In the lower-left image 230, the cut-surface 232 is shown as intersecting the selected subset (e.g. selected subset 222) of the structure of interest (e.g. structure of interest 216) along with the image plane 236 to be used for rendering. Then in the lower right image 240, the projection of the surface to yield the final rendered image is shown as rendered image 242.

In some embodiments, the viewing direction for the entire tree can be computed by aggregating the plane normal (e.g., associated with the cross product 315 of the child centerlines 325A and 325B as shown in FIG. 3) across all bifurcations in the tree. In some embodiments, the cross product 315 may include a sign change to maintain a consistent orientation rule. The consistent orientation rule can be any rule that limits the set of normal directions to contain only one signed version of any vector. For instance, a rule may be defined such that the vectors (x,y,z) and (−x,−y,−z) are not part of the same orientation rule. An example of a simple orientation rule is the following:
For the given direction (x,y,z),
   if z>0, use (x,y,z)
      otherwise, if z<0, use (−x,−y,−z)\
      otherwise, if z=0:
         if y>0, use (x,y,0)
         otherwise, if y<0, use (−x,−y,0)
         otherwise, if y=0:
            if x>0, use (x,0,0)
            otherwise use (−x,0,0)

In the illustrated example, this rule results in only one of (x,y,z) or (−x,−y,−z) being included.

In an exemplary implementation, bifurcation planes of the earlier (proximal) branches of the tree are preferred for viewing. In some such examples, methods can include using a weighted average to aggregate the bifurcation normal vectors (e.g. normal vector 305) in which the weights are inversely related to the generation number at each bifurcation. As an example, the relative weight at bifurcation b could be given by $w(b)=1/(1+anc(b))$, where $anc(b)$ is the total number of bifurcations preceding b (the number of bifurcations from which b is a descendent) in the tree.

Figure 6:
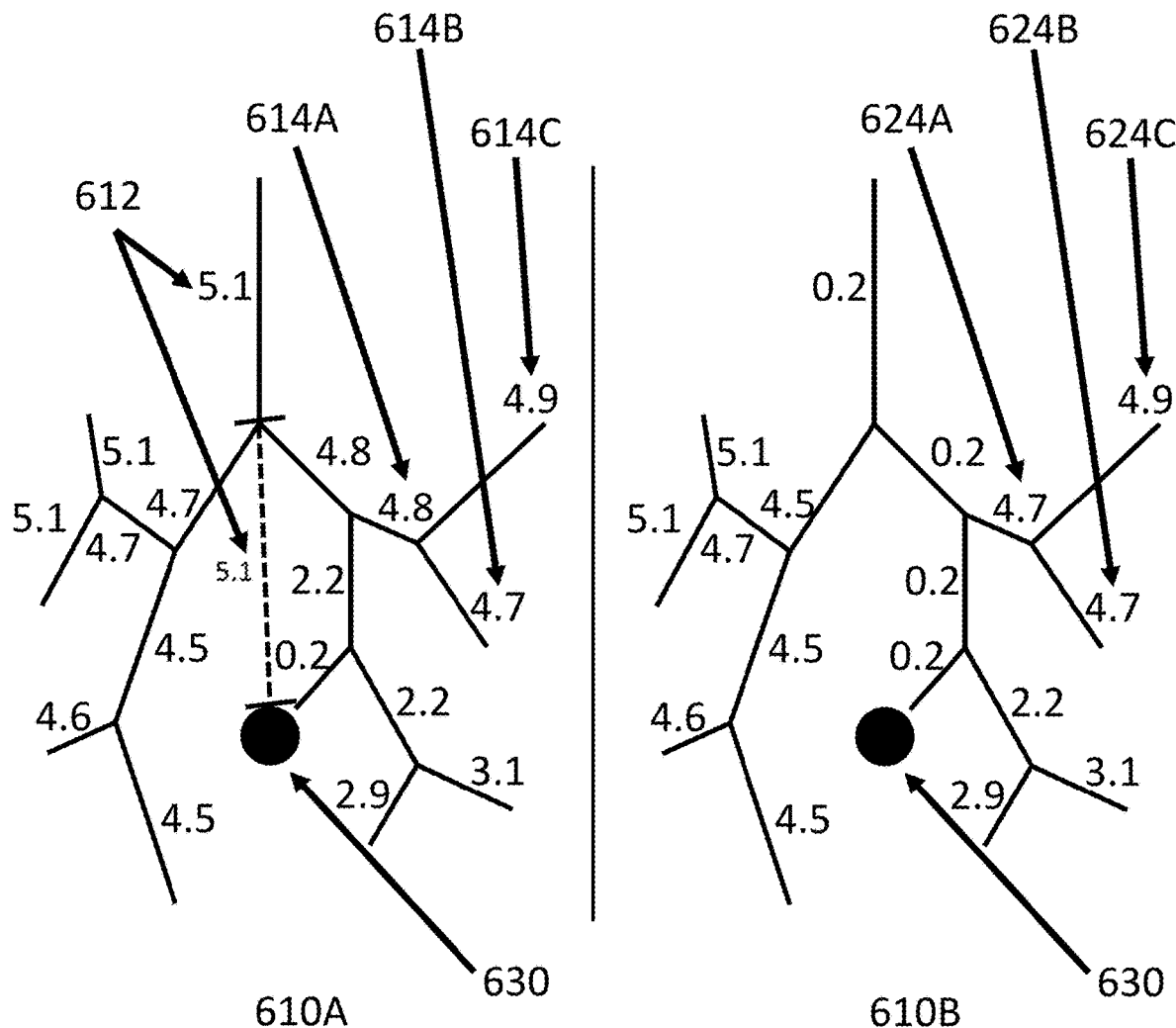
FIG. 6 shows a tree, wherein the left representation of the tree has branches labeled according to their distances to a fixed point and the right representation of the tree has branches labeled according to the minimum of their own distance as well as all the distances of their descendants from the fixed point of interest.

It will be appreciated that various weighting schemes could be chosen to optimize any desired aspect of the data. For instance, in an exemplary embodiment for generating the best view of the airway tree near one or more specific points of interest (e.g. a site of disease or abnormality), the weighting scheme could be chosen in a way such that weights are inversely related to the distance from the point(s) of interest. FIG. 6 illustrates distances to a fixed point of interest from various branches in a tree structure. As an example, the relative weight at bifurcation b could be given by $w(b)=1/(1+d(b,P))$, where $d(b,P)$ is some measure of the distance from the bifurcation b to the set of points of interest P. The point-set distance measure could be defined in the traditional way as $d(b,P)=\min_{p \in P} d(b,p)$. Furthermore, each $d(b,p)$ could be defined as $\|b-p\|$ if b is treated as a single point at the bifurcation or it could be expanded to something like $d(b,p)=\min_{x \in b} d(x,p)$, where $x \in b$ is taken to mean all points x occurring on the centerline of any branch involved in the bifurcation b (typically, the parent and two sibling branches). In various embodiments, the points of interest could be manually selected by a user, or they could be the product of an automated segmentation/detection process (for example, a tumor CAD algorithm) or both.

Additional or alternative methods can include using a shape-analytic approach to find the best view direction. Principal component analysis (PCA) is well-suited for this task and the view direction could, for instance, be chosen as the minor principal axis computed from the set of all centerline points.

In various examples utilizing volumetric image data in the case of the lung airways, it is also possible to use a fixed view direction and still achieve a high-quality result. For instance, the coronal direction (the direction looking toward the front of a subject's body, e.g. 214 of FIG. 2) works nicely for capturing the full extent of the trachea (the root of the airway tree) as well as a large share of the proximal and peripheral branches of both left and right lungs. Alternatively, sagittal projections (the directions looking at either the left or right side of the subject's body) work well if displaying left-lung and right-lung sub-trees individually.

Figure 19:
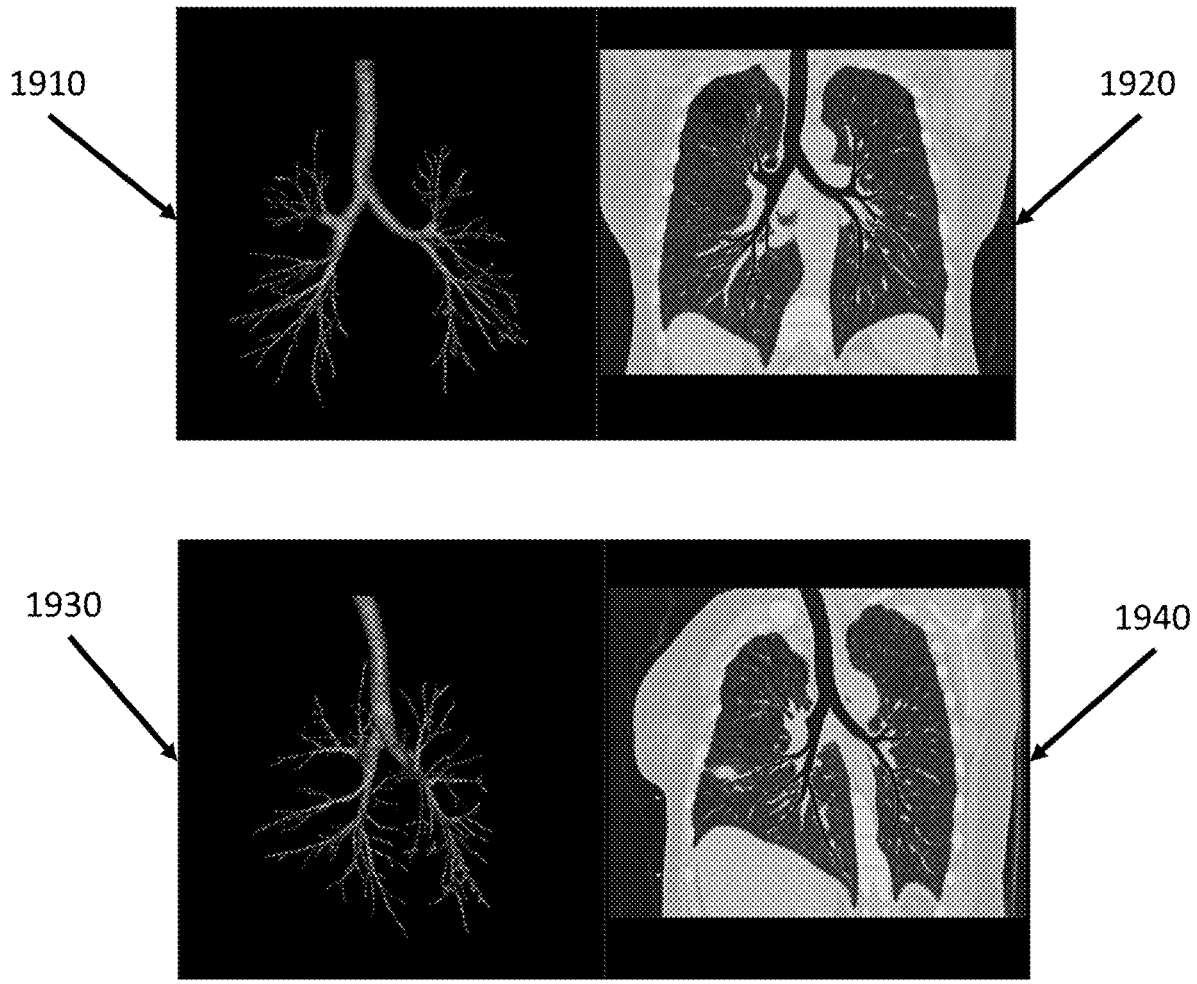
FIG. 19 shows two viewing perspectives of a 3D airway tree model and corresponding cut-surface displays.

In another embodiment, a user can define a specific desired display in some way, such as by rotating and orienting a 3D volumetric display or 2D MPR display interface in one view (e.g. the 3D views 1910 and 1930 shown on the left in FIG. 19) and then showing the resulting rendering in another view (e.g. the cut-surface display views 1920 and 1940 shown on the right in FIG. 19).

Still another embodiment could utilize a direct 3D manipulation interface to interactively display the fully rendered result in real time within the same view as they manipulate their view of the object of interest.

In some instances, it can be useful to look at comparisons of a patient's anatomy across two time-points (for example, before and after a treatment). In some such cases, the viewpoint could be selected to be anatomically identical between the two instances. Furthermore, the viewpoint in both instances might be chosen or computed to best highlight the locations of maximum change between the two time points. For example, a subset of the structure of interest could be defined as having significant change between two scan time-points (for instance, a volume or intensity change greater than some threshold value). Then a particular viewpoint calculation (PCA, weighted average of bifurcation normal, or some other mechanism) could be applied to just that subset. Alternatively, the weighted average approach could be used on the entire structure with bifurcation weights relating to the amount of change (volume, density, etc.) exhibited on any branch involved in that bifurcation. The weight function might look something like $w(b)=\max_{x \in b} c(x)$, where $c(x)$ is the measure of change at the point x among the various timepoints. Regardless of how the display is chosen, it is critical to the next step of constructing the cut-surface.

Figure 4:
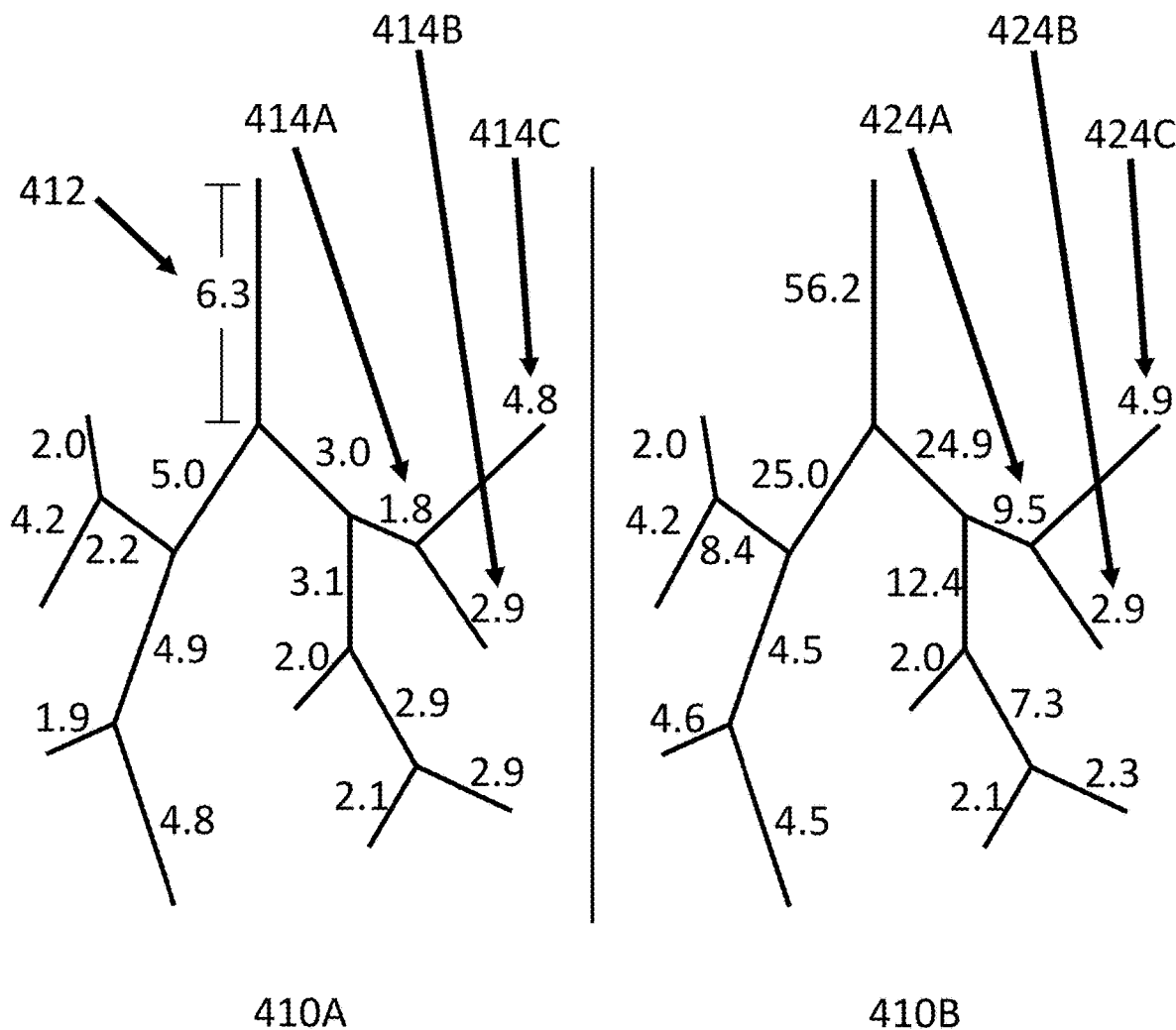
FIG. 4 shows a tree, with the left representation of the tree having branches labeled according to their length and the right representation of the tree having branches labeled according to the sum of their own length plus the length of all descendants.

Cut-Surface Constraint:

Various embodiments of the present invention include the construction of the curved cut-surface that selects which parts of the image volume are rendered on the resulting image, such as subset 222 shown in image 220 of FIG. 2. In some embodiments, a sparse set of constraint points within the object are chosen to initialize the surface and then the remainder is interpolated/extrapolated to smoothly vary everywhere else (e.g. FIG. 9). Other means of constructing the cut-surface can be performed, such as starting from a planar surface and then pushing and pulling the surface in various locations to pass through as much of the object of interest as possible. In some examples, constraining points can be selected from the centerlines of the object (e.g., an airway tree structure). In some such embodiments, the resulting surface will cut centrally through portions of the airways and thereby slice them open along their lengths, such as the examples shown in FIG. 2. If the entire centerline tree is visible along the view direction without any self-crossings (no portion of the centerline tree obstructs the view of any other portion from the perspective of the view direction), then it is possible include it entirely in the initializing surface constraint. However, most anatomical tree objects (especially those with many branches) have enough complexity that this is not the case. For instance, various branches may cross one another when viewed from the viewing direction, as shown in image 510 of FIG. 5. To accommodate for such complexities, in some examples, an algorithm can be used to select a subset of the object such that no part of the subset passes in front of another part of the same subset from the point of view of the view direction. In some embodiments, for instance, embodiments concerned with a tree structure, choices of inclusion can be made on a branch by branch basis. Branches can be considered in some defined order and each branch can be selected for inclusion in the surface constraint if it does not cross (in front of or behind from the point of view of the view direction) any branch that has already been included. In an exemplary embodiment, a greedy approach can be used to the branch ordering problem in effort to maximize the combined length (relative to the view plane) of all selected branches. Such a process can be performed by assigning a score to each branch in the tree, for example, the sum of its projected length together with the projected lengths of its descendent branches in the tree. Projected lengths can be calculated by determining the length of the centerline of each branch after it has been projected to a plane normal to the view direction. This method generally results in scores that are maximal at the tree's root(s) and minimal at the tree's leaves (e.g., see FIG. 4). FIG. 4 shows a tree 410A-B, with the left representation 410A of the tree having branches labeled according to their length and the right representation 410B of the tree having branches labeled according to the sum of their own length plus the length of all descendants. Length 412 shows an example of a signal branches length. With respect to tree 410A, branches 414A-C are labeled as having lengths 1.8", 2.9", and 4.8" respectively. Moving to tree 410B, it is seen that branches 424B and 424C have the same labels of 2.9" and 4.8", and then branch 424A is labeled with the length of 9.5". This is because the sum of the branches to the point of branch 414A, 424A is 9.5" (1.8"+4.8"+2.9"=9.5"). As shown, the value at parent branch 424A may update its value to be representative of the sum of itself (e.g. having a length of 1.8") plus the weights of its descendent branches 424B and 424C (e.g. having lengths of 2.9" and 4.8").

Figure 5:
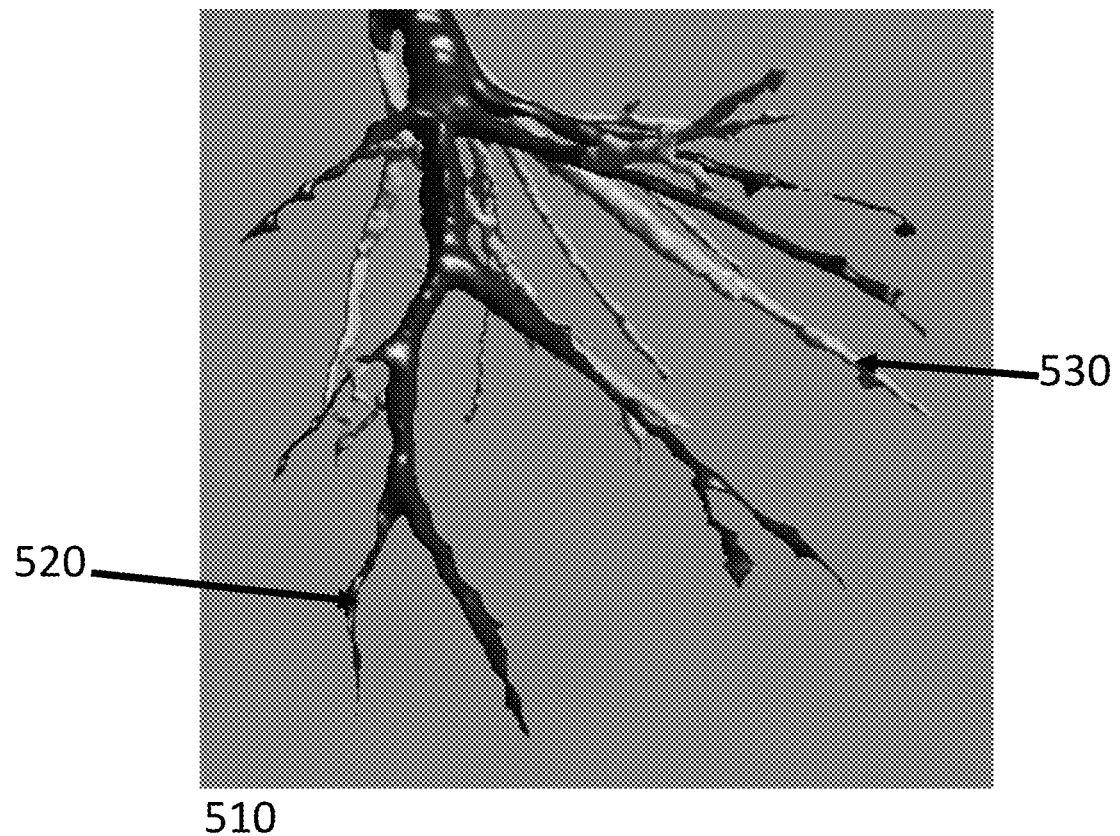
FIG. 5 shows a 3-D representation of branches of a lung.
Figure 7:
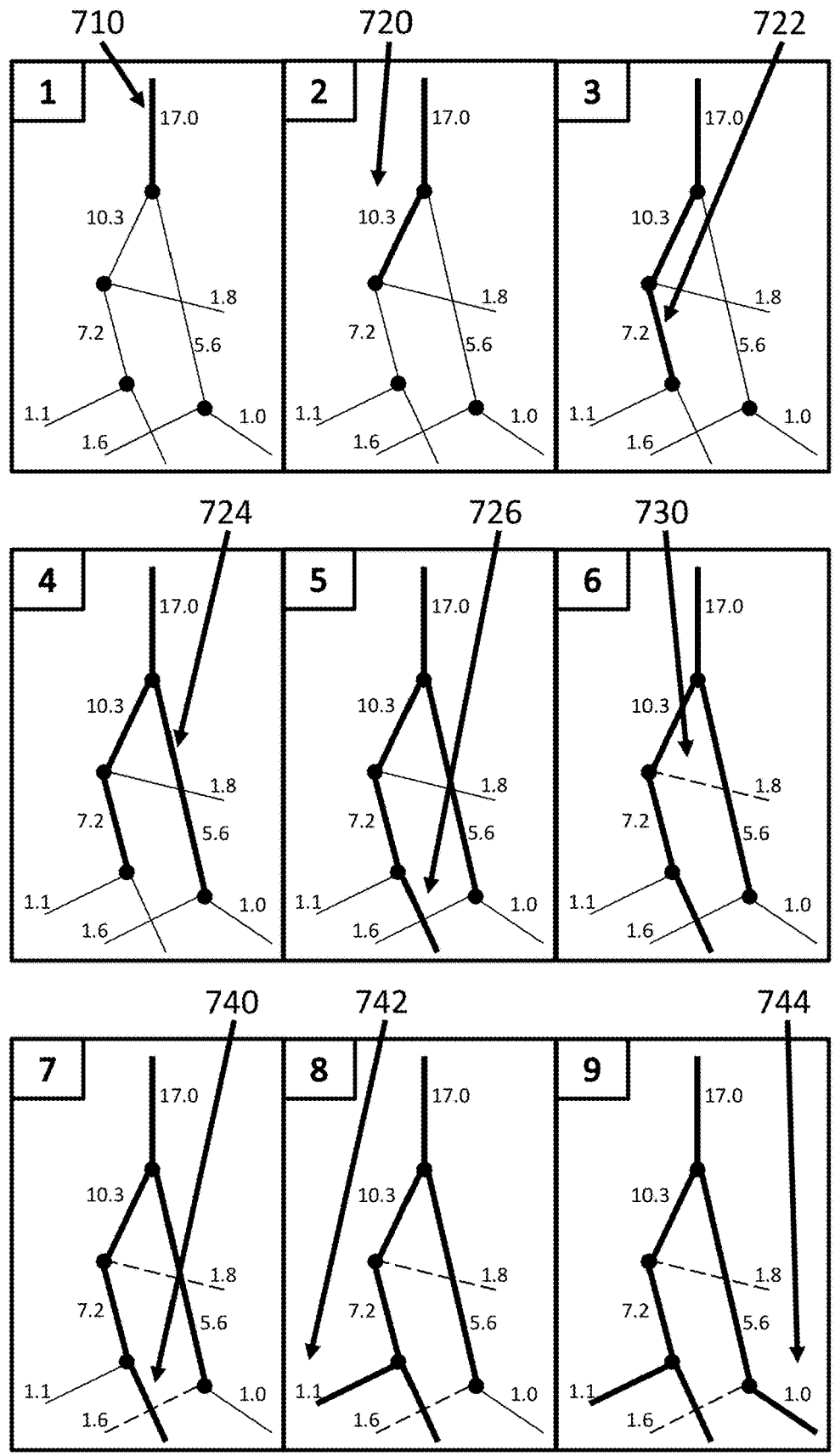
FIG. 7 shows an exemplary sequence of inclusion decisions made for a prioritized set of branches in a tree structure.

After applying scores to various branches the method can include traversing the list of branches in order of highest to lowest score and choosing to include a branch if its centerline does not pass in front of nor behind any previously included centerline relative to the view direction (e.g., see FIGS. 5 and 7).

In the exemplary embodiment of FIG. 5, the darker shaded branches 520 represent those already selected for inclusion in the initial surface constraint, and the lighter shaded branches 530 represent rejected branches. Branches may be rejected because at some point, they pass either in front of or behind the darker shaded branches 520 from the given point of view.

The priority ordering described is just one possible embodiment. There are many ways that the priority order could be assigned depending on the information most relevant to the scenario. For instance, instead of branch length, the priority could be assigned based on distance to one more "interesting" regions in the image (disease sites, treatment targets, etc.). In some such examples, branches closer to the interesting regions could be prioritized higher.

FIG. 6 shows a branch labeling scheme based on distance to a given point of interest (e.g. point of interest 630) on tree 610A, B. As shown in FIG. 6, the left representation 610A of the tree having branches labeled according to the branch's minimum distance from all the points along its centerline to point of interest 630 and the right representation 610B of the tree having branches labels according to the minimum distance from all the points along its centerline as well as all the points on the centerlines of all tits descendent branches. Branch 612 has a label of 5.1". As shown on tree 610A, the minimum distance between the centerline of branch 612 and the point of interest 630 is 5.1". In a similar fashion, branches 610A-C are labeled with the values 4.8", 4.7", and 4.9", respectively. Turning to tree 610B, it is seen that branches 624B and 624C have the same labels of 4.7" and 4.9", and then branch 624A is labeled with a value of 4.7". This is because with respect to branch 424A, branch 624B has the minimum distance from its centerline to point of interest 630 at 4.7". As shown, the value at parent branch 624A may update its value to be representative of the minimum distance to the point of interest (e.g. point of interest 630) by itself or any of its descendants. Branch selection could traverse the list in tree 610B in order of lowest to highest label, again choosing to include a branch if its centerline does not pass in front of or behind any previously included centerline relative to the view direction. This labeling scheme promotes branches close to the point of interest, as well as their entire path up to the root (trachea in the case of lung airways).

Priority ordering could follow from lowest to highest label. Similarly, the priority ordering could be based on the distance to some 2D plane positioned within the volume, where branches nearer to the plane are assigned higher priority than those further away. In some examples, such a plane could be parallel to the view plane (normal to the view direction). A sequence of cut-surface displays could be generated by moving a plane through the volume along its normal direction and generating a cut-surface display for each discrete position. The collection of all these displays could be "played back" or "scrolled through" in sequence, resulting in a dynamic and animated visualization of the structure of interest.

In some embodiments, such as in the case of longitudinal analysis, for example, priority could be assigned based on the amount of change between one or more time points. In some such examples, branches with greater change (narrowing, wall thickening, etc.) could be given higher priority. This ordering may not necessarily need to be hierarchical. Branches could be labeled strictly according to the maximum amount of change (as compared to a scan from another time point) over their entirety. Branch traversal for constraint inclusion could follow from highest to lowest label.

Once a priority ordering has been assigned to the various parts of the structure, then the various components can be considered for inclusion in the surface constraint-defining set. Beginning with the component with the highest priority, the constraint set can be defined by including elements that do not obstruct and are not obstructed by others that have been included already with respect to the perspective of the view direction. FIG. 7 shows an exemplary sequence of inclusion decisions made for a prioritized set of branches in a tree structure. At each step, the branch with the highest priority is either included or excluded depending on the obstruction criterion.

FIG. 7 shows a tree with branch values corresponding to their priority for consideration in the constraint set (higher values have higher priority). The sequence of inclusion decisions is shown in frames 1 through 11. Thin black lines correspond to branches that have not yet been considered and thick black lines represent branches being included in the constraint set. Branches represented by a dashed line are omitted from the constraint set due to obstruction. In frame 1, branch 710 has the highest priority value of 17.0 and is chosen first. Then in frame 2, the branch with the second highest priority value, branch 720 with a value of 10.3, is chosen since it does not cross previously included branch. The process continues to choose the next highest priority value in frames 3-5 where branch 722 with a value of 7.2 is chosen; then branch 724 with a value of 5.6 is chosen; and then branch 726 with a value of 3.5 chosen. Moving onto frame 6, the remaining branch with the highest priority, branch 730 with a priority value of 1.8, is omitted because it crosses with previously selected branch 724. Similarly, in frame 7 the branch with the next highest priority level, branch 740, is omitted because it crosses with previously selected branch 726. The process then continues with frames 8 and 9 where branch 742 with a value of 1.1 is chosen and branch 744 with a value of 1.0 is chosen. The final set of selected and omitted branches is shown in frame 9 where branches 710, 720, 722, 724, 726, 742, and 744 are chosen while branches 730 and 740 are omitted.

In some examples, to capture image characteristics just beyond the critical locations at the distal and terminal ends of the segmented branches, the centerlines used for the constraint initialization could be extrapolated outward some distance from where they terminate. Similarly, image analysis within the narrow cone-shaped regions emanating from the terminal ends of centerlines could also provide guidance to where the cut-plane constraints should be extended to get the best sample set for the final display. Yet another variation could be to render bounded cone-shaped regions at the terminal end of each centerline using a MIP or MinIP to highlight potentially interesting characteristics at the distal ends of the object's branches (for example, mucous plugs in a lung airway tree).

To select branches for initialization, an additional optional constraint can include using branches whose parent branch has already been included in the selection. An even tighter constraint could be applied whereby a branch is only included if all its sibling branches can be included as well. Other constraints could be defined to control the smoothness of the cut-surface (an attribute that directly affects the amount of distortion in the final image). For instance, a criterion could be set such that the 3D distance between two points on different selected branches cannot exceed some pre-defined multiple "M" of the 2D distance of their projected locations on the image plane. The parameter "M" could be used to control the amount of distortion in the final result.

Alternative approaches to the constraint selection problem could be utilized in view of the nature of the object of interest and the priority of what portions of the object get rendered in the final result. For instance, rather than the greedy and linear prioritizing approach, a more global optimization scheme could be applied, for instance, wherein the sum (or sum of squares, etc.) of an objective value at each included point is maximized subject to the constraints that projections do not overlap. The objective value could be based on branch length or some other prioritization metric such as an attribute of the surrounding region, irregularity of the local structure, probability of disease, or anatomical label. In yet another embodiment, the choice of which parts of the object to force the cut-surface to pass through could be made by a user.

Cut-Surface Construction

After the initial set of points has been chosen on the cut-surface, various methods include defining the way the rest of the cut-surface carves through the image volume. The remainder of the surface can be constructed in any number of ways. In some examples, the cut-surface is defined so that it is smoothly varying and does not overlap itself relative to the perspective of the chosen viewpoint. One possible way to do this is to use a parametric surface representation (such as a NURBS surface) with fixed vertices at the initializing point set and minimal curvature elsewhere. In some embodiments, the cut-surface can be constructed implicitly by defining a discrete set of point locations on it that correspond exactly to the pixels in the final output image. These cut-surface point locations can be defined by tracing vectors from each pixel in the rendering image plane to some depth value along the view direction. In an exemplary embodiment, depths are assigned at the previously selected set of constraining centerline points (e.g. points 818 of FIG. 8) and an iterative polling and averaging process can be used to propagate the depths outward to neighboring pixels in the image plane (e.g. FIG. 9). In various such examples, the image plane can be chosen to be any plane that is normal to the view direction and positioned in front of all points in the image volume. In some examples, for each constraining cut-surface point in the initialization set, the corresponding grid pixel is determined via projection to the image plane along the view direction, such as image plane 830 and the pixel there is initialized to the value of its depth.

Figure 8:
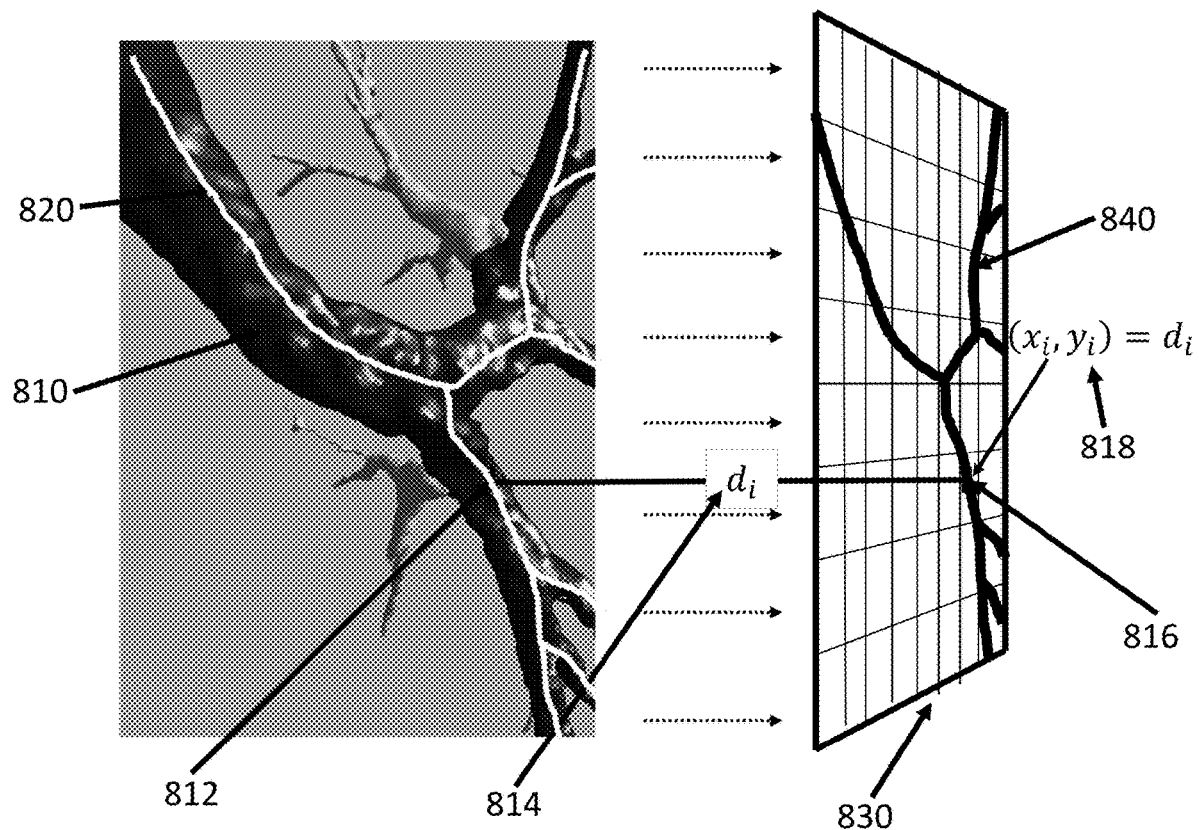
FIG. 8 shows an example of an initialization of a depth image.

FIG. 8 shows an example of an initialization of a depth image. In the illustrated example, the dark shaded selected branches 810 have been pre-selected to initialize the cut surface. The centerline points 820 of the selected branches 810 are then projected onto image plane 830 and the depths are recorded at the resulting pixels. In some embodiments, image plane 830 comprises a plurality of points and/or lines 840 representing the projected centerlines 820. For example, point 812 on centerline 820 is projected onto image plane 830 at location 816. The pixel at location 816 is initialized with the value of di—the distance from the centerline point 812 being projected to the image plane 830.

In some examples, the depths at all initialization pixels (e.g. image 910 in FIG. 9) in the constraint set remain fixed throughout the course of the evolution. From here, the depth values at the remaining pixels may evolve by continually propagating and averaging the values amongst neighboring pixels, such as shown in images 920 and 930, until a stable point is reached (e.g. image 940). In an exemplary embodiment, all pixels in the image (e.g. image 910) are marked as "unassigned" except for the initialization pixels. At step one, each "unassigned" pixel that is adjacent to one or more initialization pixels is "assigned" with the average value of all of its initialized neighbor pixels. Thus, the set of "assigned" pixels may grow outward by one pixel. For each subsequent iteration, the value at every pixel, other than pixels in the original initialization set, may be replaced by the average of all of its "assigned" neighboring pixels. This process may continue until a specified stability criteria is reached and/or a specified amount of iterations are performed. An example set of stability criteria is: (1) when no "unassigned" pixels remain and (2) when no pixel value changes by more than a chosen percentage from its value in the previous iteration.

Figure 9:
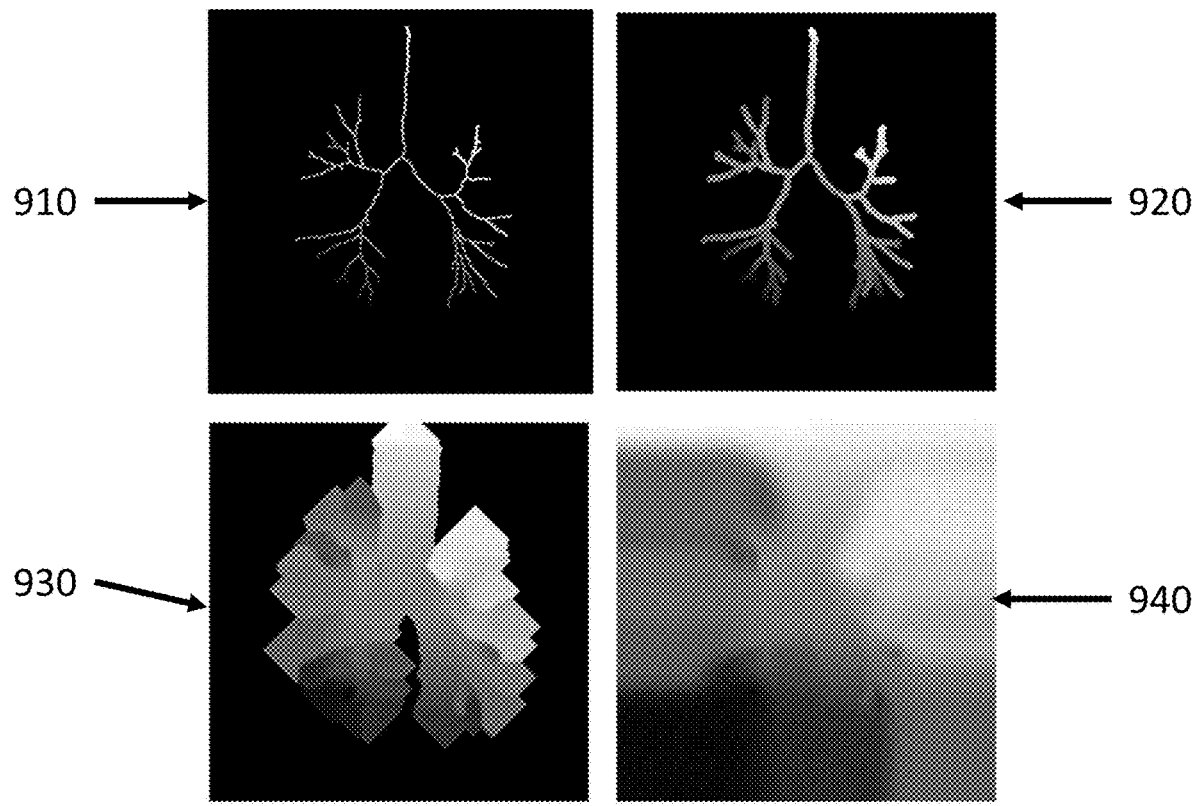
FIG. 9 shows an example of various stages in the evolution for an airway tree example, beginning with an initialized depth image and ending with a fully populated and smoothly varying depth image.

FIG. 9 shows an example of various stages in the evolution for an airway tree example. The upper-left image 910 shows the initializing constraint set; the upper-right image 920 shows the depth image after 10 iterations; the lower-left image 930 shows the depth image after 100 iterations; and the lower-right image 940 shows the final, stable depth image.

Once the entire depth image has been populated, then the corresponding 3D cut-surface point at every pixel is thereby defined. Any sampling and/or rendering method can be used to then assign image values at each pixel based on the values in the source scan volume. In an exemplary embodiment, trilinear interpolation can be used to sample the gray values at the various cut-surface points from the CT image volume. In some examples, the resulting display can be 8-bit, 16-bit, or any preferred format. In the case of 16-bit output, the resulting image can be viewed in many different types of commercial medical imaging software and take advantage of window/level adjustments. However, other formats may be suitable as different software is developed. An exemplary airway case document is shown in FIG. 10 wherein the implicit cut-surface are shown in images 1010 and 1020 and the resulting final display image is shown in image 1030.

Figure 10:
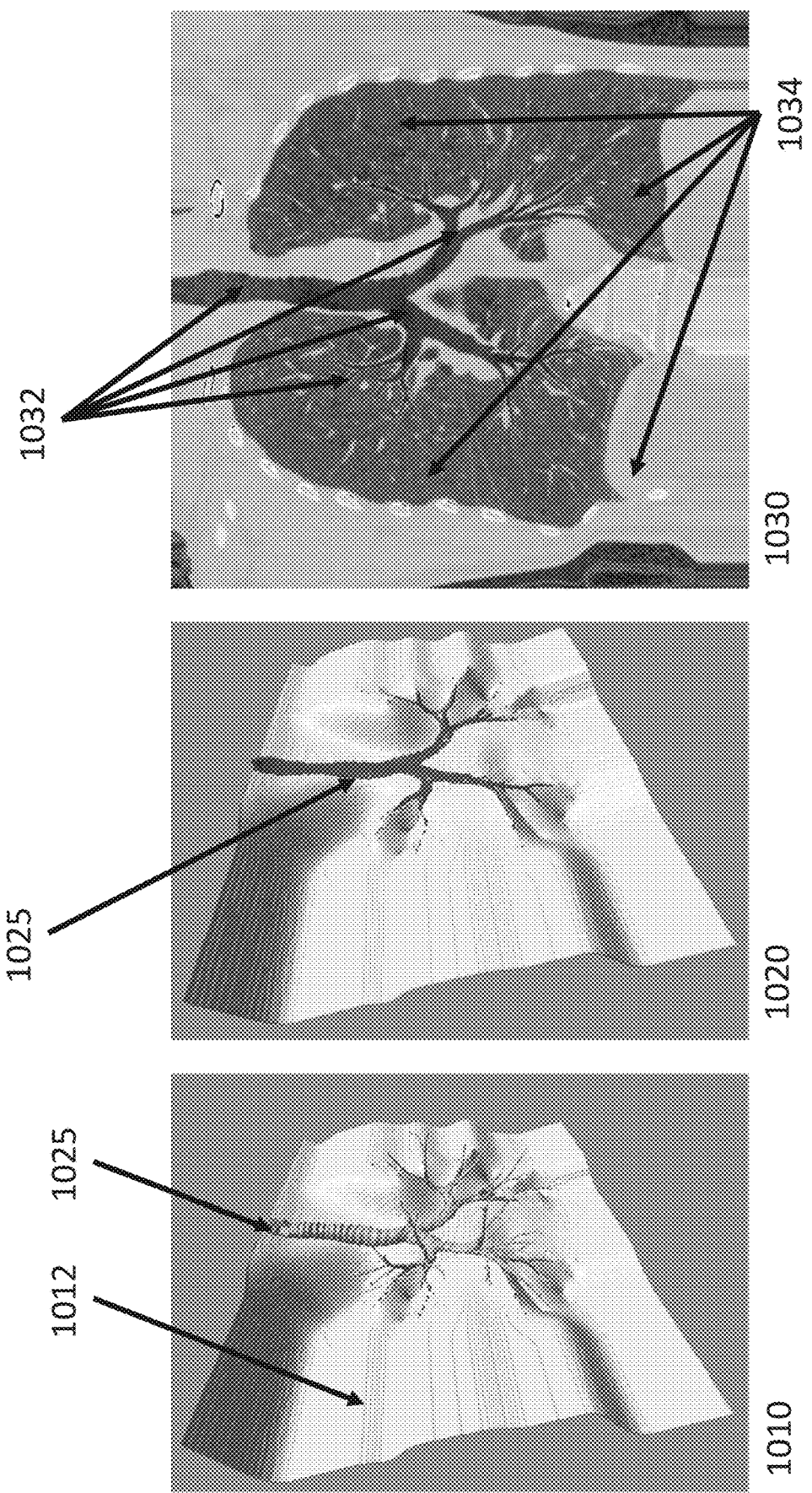
FIG. 10 shows a final resulting cut-surface generated image for an example airway structure case.

FIG. 10 shows a final resulting cut-surface generated image for an example airway structure case such as those discussed herein. The image 1010 of FIG. 10 shows the implicitly defined cut-surface 1012 (shown in white) intersected with the entire object of interest 1025 (lightly shaded). The image 1020 then shows the cut-surface with just the intersected portions of the object of interest 1025, now darkly shaded. Moving to image 1030, image 1030 depicts the final display based on tri-linearly interpolated gray value samples from the source CT image volume.

In this example, the airways that formed the initial constraints on the cut-surface are centrally intersected by the cut-surface and therefore clearly displayed in the resulting image, such as shown in regions 1032. Regions 1032 of the final image 1030 are the main targets of what is specifically intended to be displayed. The rest of the surrounding parenchyma and other tissues from the scan volume are intersected by the cut surface 1012 based on the way the surface was interpolated and/or extrapolated by the evolution step. Some examples of image locations that were not part of the specific object of interest (e.g. object of interest 1025), but rather part of the "background" that happen to be intersected by the cut-surface are shown, such as shown in regions 1034.

Figure 11:
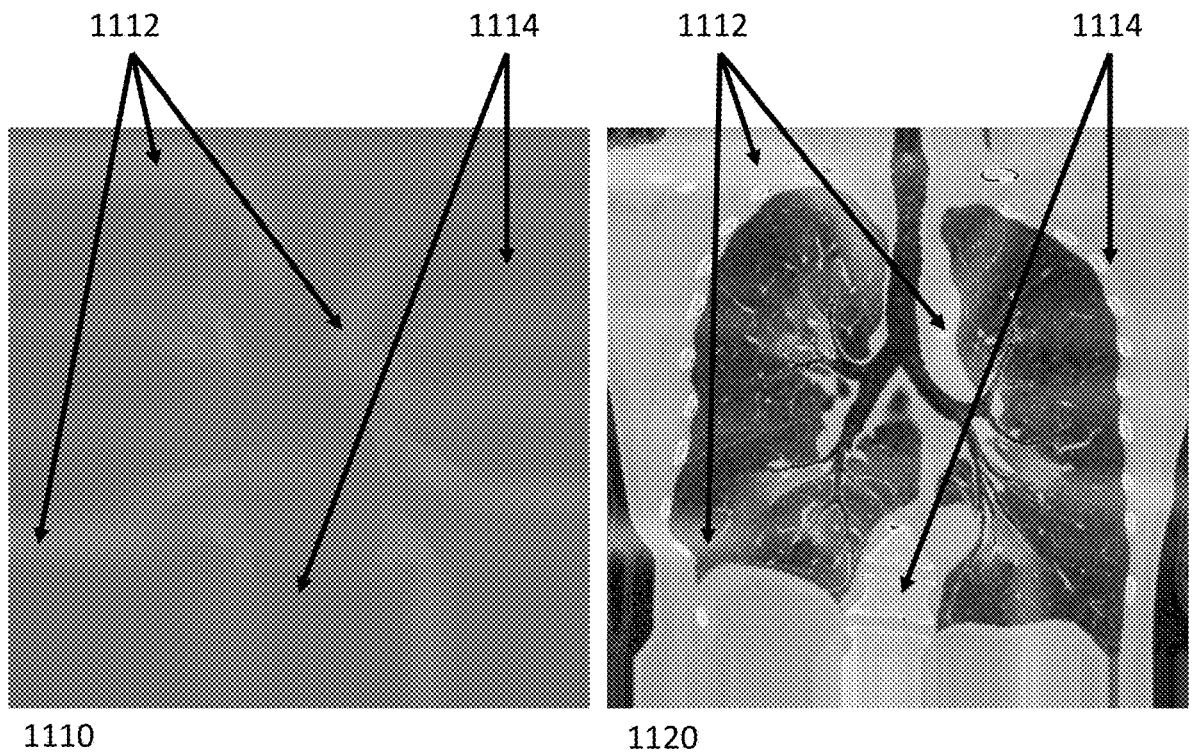
FIG. 11 illustrates the amount and locations of distortion present in the exemplary airway case document shown in FIG. 10.

In some examples, if the cut-surface used for rendering is curved, the resulting display will exhibit inherent distortion. The degree of distortion can be easily measured by sampling the depth image gradient at each pixel. FIG. 11 illustrates the amount and locations of distortion present in the exemplary airway case document shown in FIG. 10. FIG. 11 shows images indicating the amount of distortion present at each pixel. Turning to image 1110, image 1110 shows raw distortion data in which darker gray portions 1114 correspond to less distortion and lighter gray portions 1112 correspond to more distortion. Then image 1120 shows the distortion data of image 1110 (e.g. portions 1114 and 1112) overlaid on image 1030.

In some examples, various techniques can be incorporated to reduce an amount of distortion. In some embodiments, a user may observe an amount of distortion present, such as via a display displaying image 1120, and choose to render a cut-surface differently in order to reduce the amount of resulting distortion.

Figure 12:
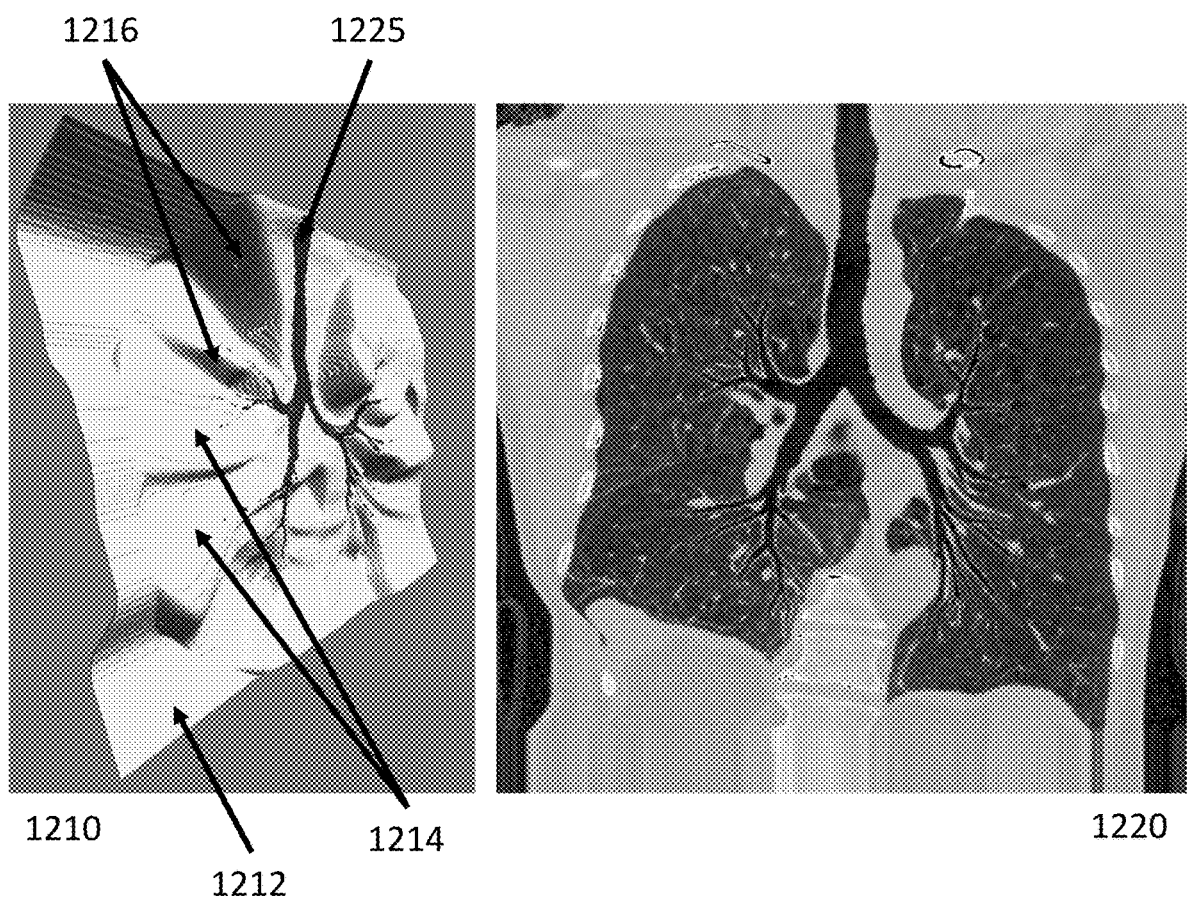
FIG. 12 shows an exemplary cut-surface and resulting display for an alternative embodiment that reduces, localizes, and/or narrows the image distortion.

FIG. 12 shows an exemplary cut-surface and resulting display for an alternative embodiment that reduces, localizes, and/or narrows the image distortion. Image 1210 of FIG. 12 shows the cut surface 1212 (lightly shaded) along with the intersected airway 1225 (darkly shaded). As shown, cut-surface 1212 exhibits steeper elevation changes between broader flat areas of cut-surface 1214, such as areas 1216. Image 1220 then shows the final display for the embodiment utilizing the cut surface shown in image 1210.

Figure 13:
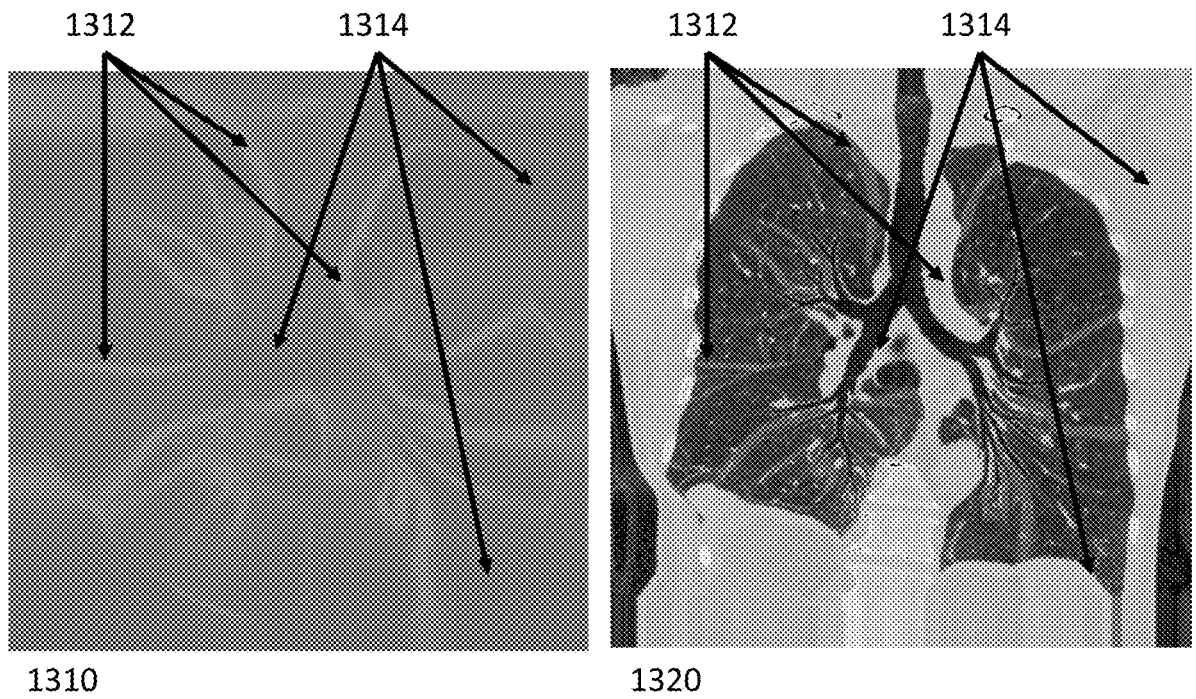
FIG. 13 shows distortion data resulting from a cut-surface.

FIG. 13 shows distortion data resulting from the cut-surface 1212. Image 1310 of FIG. 13 shows exemplary raw distortion data in which portions 1314 (darkly shaded) correspond to less distortion and portions 1312 (lightly shaded) correspond to more distortion. Then, image 1320 shows the distortion data of image 1310 (e.g. portions 1314 and 1312) overlaid on image 1030.

In some examples, this technique could be sequenced to generate multiple displays that eventually capture every branch in the structure of interest. A potential embodiment could generate the display and then remove all leaf branches (branches with no descendants) that were rendered in a previous iteration and then re-run the process on the reduced tree, continuing until all leaf branches have been rendered. This way, branches that were omitted (e.g., due to overlap with the currently selected set) could be captured in a subsequent iteration.

In addition or alternatively to various examples described elsewhere herein, various features can be included.

For instance, in some embodiments, selecting the surface-constraining subset of the object of interest could be pre-defined as a fixed anatomical subset. For example, in the case of an airway tree, the constraint subset could be a predefined subset of the anatomically labeled airway branches. In some examples, such methods can be performed using a labeled and segmented structure of interest be labeled. Such a labeling can be accomplished through various automated methods or assigned/edited by a user.

In some examples, direct adjustment of the surface-constraining subset can be performed by a user. For instance, in some embodiments, the user could explicitly select or de-select portions of the structure of interest in order to affect the cut-surface constraints and then the cut-surface could be updated accordingly. For example, if a particular desired portion of the structure of interest is not included in the display, then the user could add some part of this as a constraint, for instance by clicking on various points within that portion. Similarly for excluding a particular undesired portion that was included in the display.

In some examples, animations or play-backs of pre-computed display sequences can be created. These sequences could be generated based on a set of continuously varying view directions. For instance, a sequence of viewpoints looking toward the center of the structure of interest could be sampled from a 360 degree rotation around it. The cut-surface display for each of these viewpoints could be pre-computed and then the sequence of resulting images could be rendered as an animation. Optionally, the user could control the playback via basic play forward, play backward, and pause controls.

Various examples described herein can be used for generating a single display or discrete set of displays and/or could be integrated into a more complex visualization application. Generated surfaces are often homeomorphic to the image plane to which the final image is rendered, and points from the 2D display image can generally be mapped to a unique location in the 3D volume, for example, by interpolating the depth at a given 2D location in the display and projecting out from the image plane along the view direction by that depth to arrive at the corresponding 3D location. Vice-versa, any point in the 3D volume can be mapped to its corresponding projection on the 2D display and easily query whether it lies directly on the surface or in front of it or behind it. These properties allow for a number of functionalities to be available in a display interface. Exemplary use cases are described below.

Use Case (A)

In some examples, the fact that each display pixel corresponds to a unique 3D volume location means that auxiliary views (e.g. axial/sagittal/coronal) can be presented alongside the display for any selected 2D location. In some embodiments, a user could use a "cross-hair" tool to select a cross-hair position in the surface display and the uniquely defined axial/sagittal/coronal planar MPRs could update accordingly, for example, as shown in FIG. 14.

Figure 14:
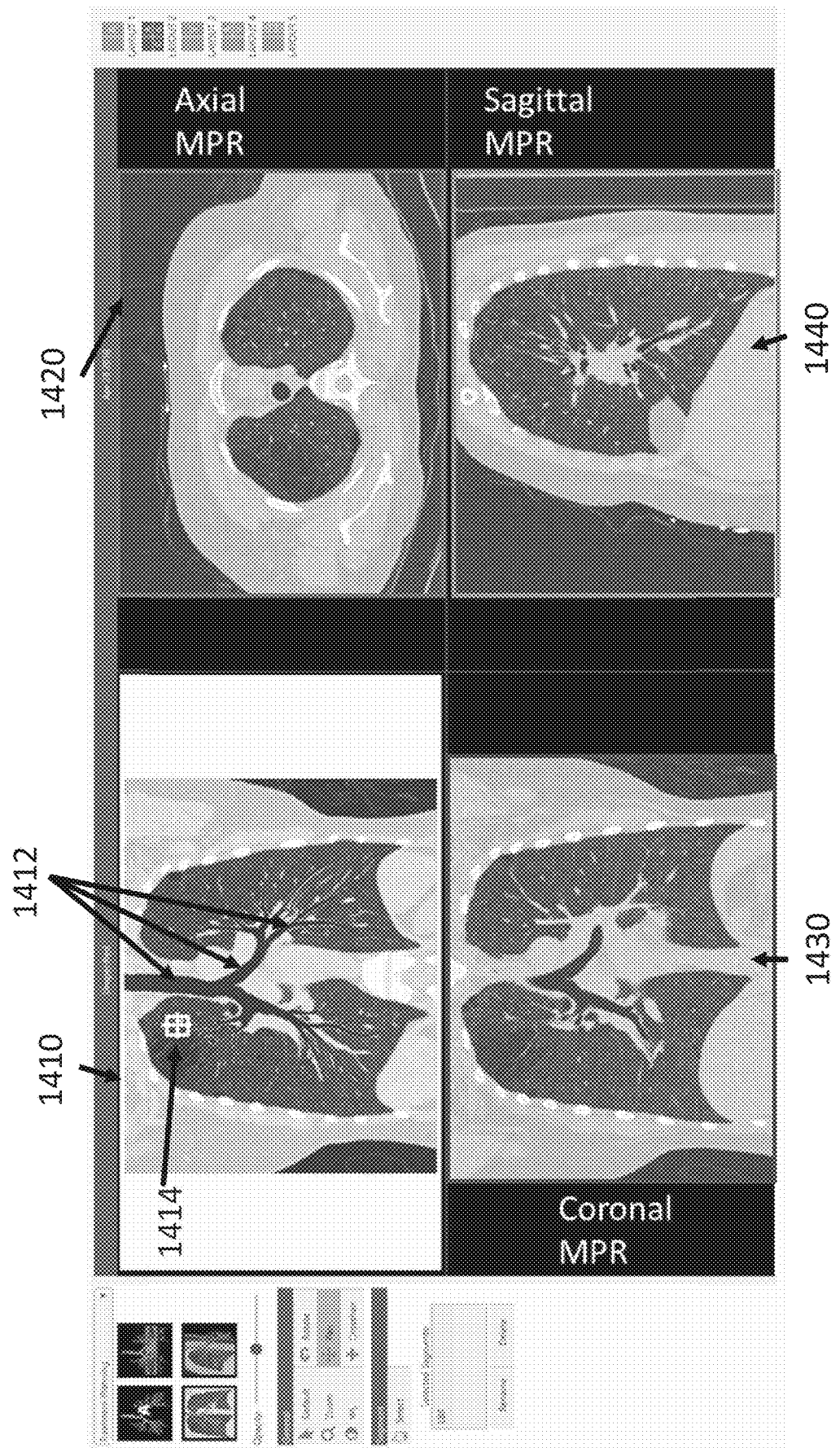
FIG. 14 shows multiple exemplary displays of a cut-surface with multiple cross-referenced views.

FIG. 14 shows a cut-surface display 1410 (upper left corner) in which multiple airway branches and bifurcations 1412 are simultaneously visible. A cross-hair 1414 is placed at a 2D location and then a corresponding 3D point is derived from the depth to the cut surface. Various planar and/or auxiliary MPR views, whose planar positions corresponds to the cross-hair location, are shown as axial MPR image 1420, coronal MPR image 1430, and 1440 sagittal MPR image 1440.

Figure 15:
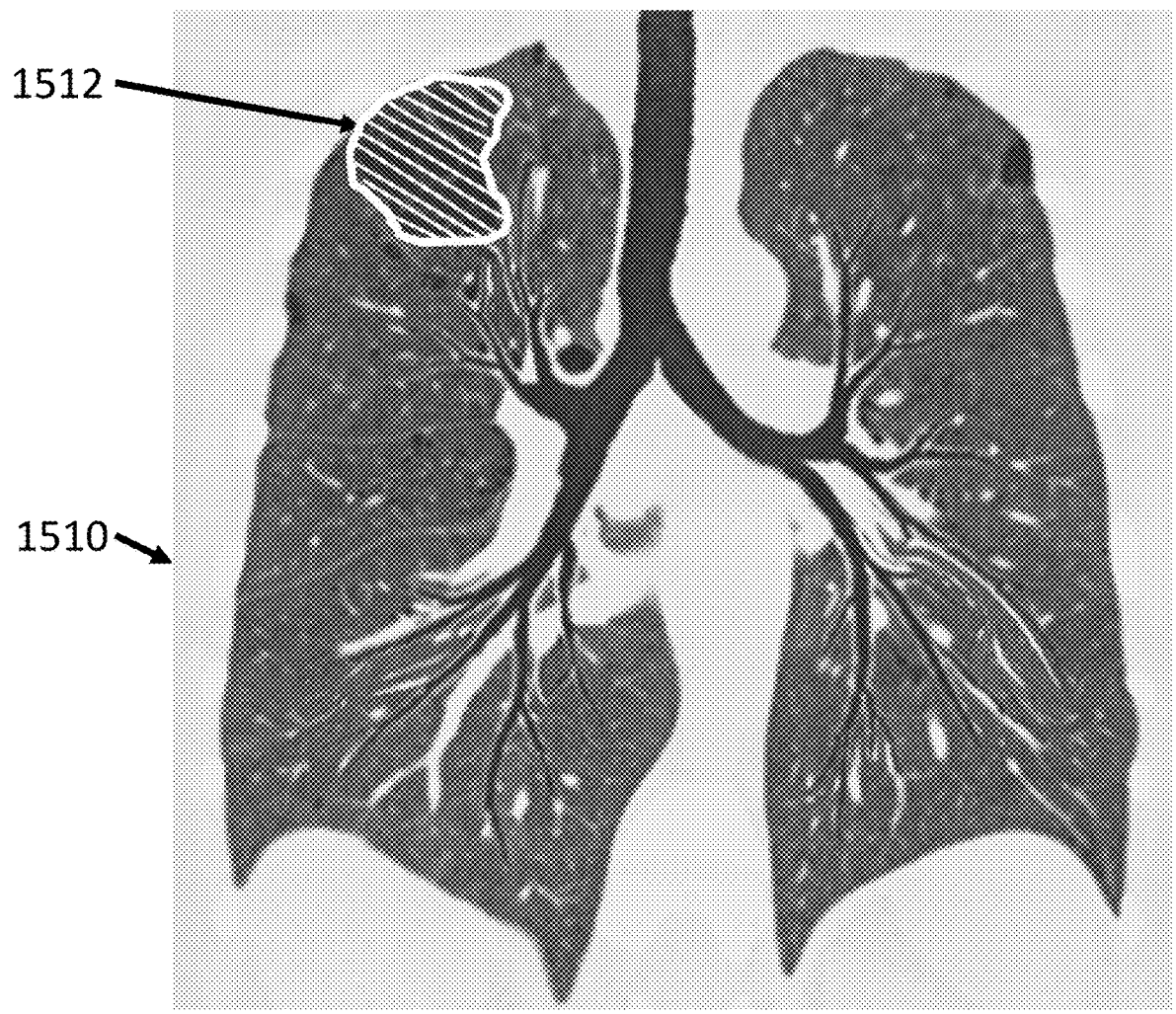
FIG. 15 shows a region overlaid on the cut-surface display to indicate tissue regions of below-normal density.

Additionally, any property assigned to the 3D volume locations represented in the display (e.g. tinting to highlight tissue properties, labeling corresponding to anatomical name, or other annotations) could be readily transferred over to their pixel location in the 2D display, for example, as shown in FIG. 15. FIG. 15 shows region 1512 overlaid on the cut-surface display 1510 to indicate tissue regions of below-normal density.

Figure 16:
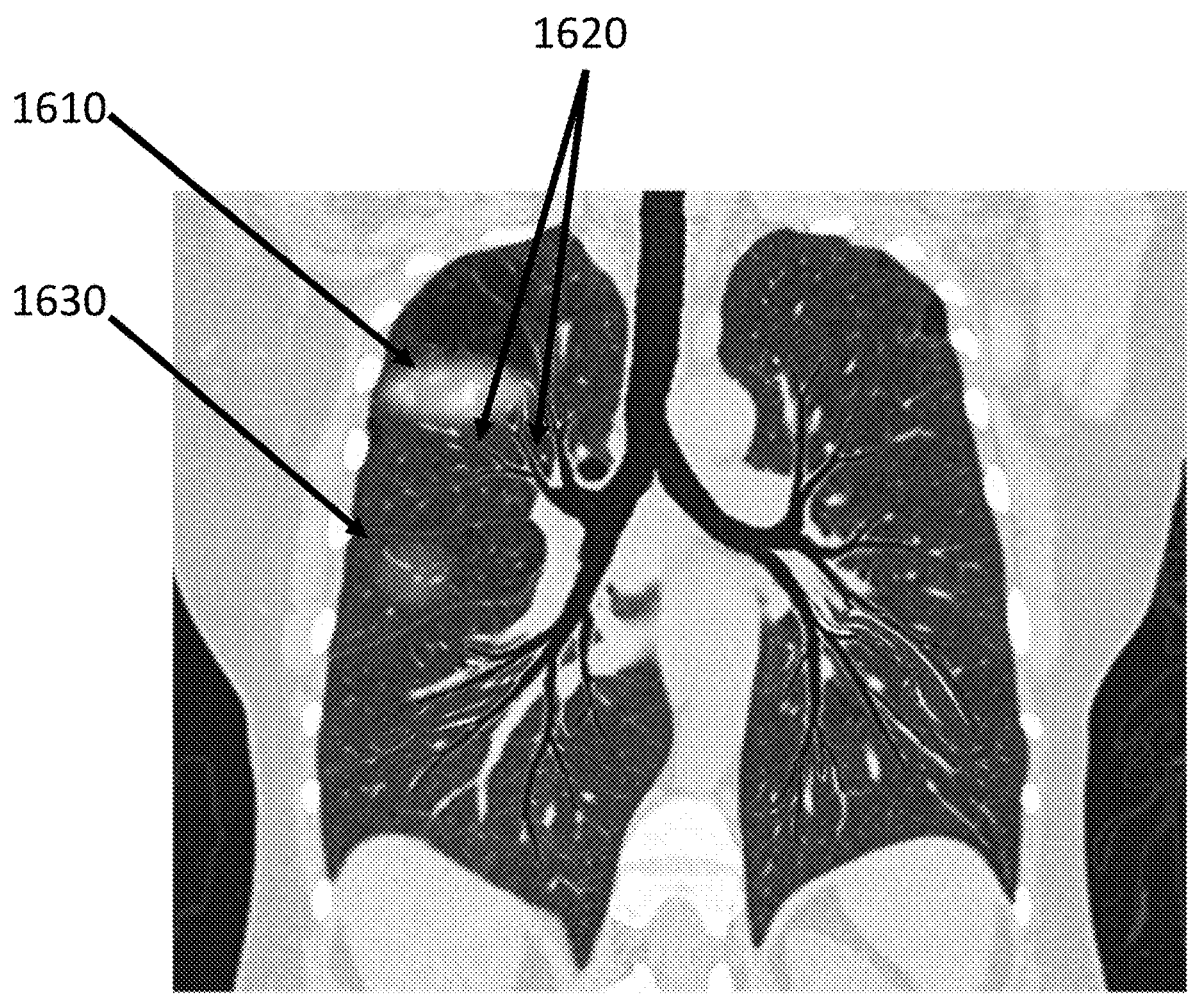
FIG. 16 shows 3D lung nodes super-imposed on a cut-surface rendering.

Auxiliary structures or regions in the 3D volume can be mapped to some subset of pixels in the 2D display by projection. In various examples, such structures or regions could either be behind, in front of, or intersecting with the surface, and their projected shapes could thus be superimposed accordingly, e.g., as shown in FIG. 16. FIG. 16 shows 3D lung nodules super-imposed on the cut-surface rendering. The opaque nodule 1610 lies in front of the cut-surface (from the given viewpoint), while the semi-transparent nodule (1630) lies behind it. The simultaneous airways displayed in the cut-surface rendering indicate multiple airway paths that lead to regions of the lung near the overlaid nodules 1620.

Use Case (B)

In some examples, similarities between the surface being rendered and the traditional planar cross-section (MPR) allow for many of the manipulations typically available for MPRs in visualization software to be implemented in the cut-surface display. For instance, the surface may be moved forward or backward along the view direction in order to scroll through the image volume in a sequence of parallel renderings, e.g., as shown in FIG. 18. FIG. 18 shows images acquired by moving the original cut-surface forward and backward along the view direction. Image 1850 shows the original cut-surface display (0mm). Images 1810-1840 show four sample images with the cut-surface translated backwards (relative to the view direction) by different amount. More specifically, image 1810 shows the cut-surface translated by −10 mm; image 1820 shows cut surface translated by −7.5 mm; image 1830 shows the cut-surface translated by −5 mm; and image 1840 shows the cut-surface translated by −2.5 mm. Images 1860-1890 also show four sample images with the cut-surface translated forwards (relative to the view direction) by different amounts. More specifically, image 1860 shows the cut-surface translated by +10 mm; image 1870 shows cut surface translated by +7.5 mm; image 1880 shows the cut-surface translated by +5 mm; and image 1890 shows the cut-surface translated by +2.5 mm. Translating the cut-surface by different amounts can be implemented similarly to the "cine" or "scroll" manipulation typical of planar MPR images. It is also possible to impose a "thickness" on the surface, similar to what is typically done for MPR planes. For instance, in some embodiments, each pixel in the 2D display corresponds to a set of multiple locations in the 3D volume. Similar to various processes of thick MPR images, the display at the pixel can be defined from the 3D location set by means of averaging, maximum intensity projection (MIP), minimum intensity projection (MinIP), or other techniques, such as the one shown in FIG. 17.

Figure 17:
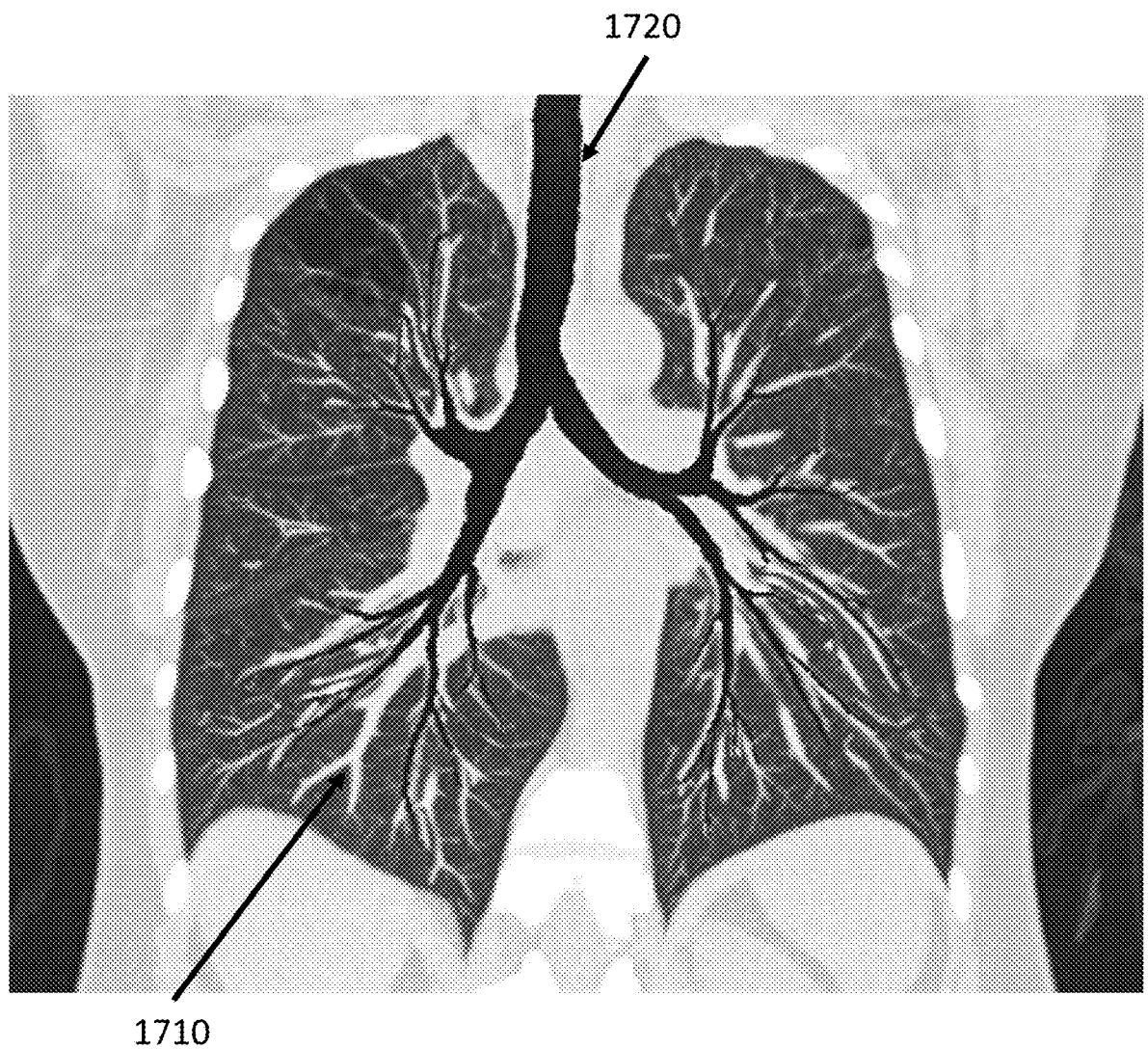
FIG. 17 shows a cut-surface rendering with a set amount of thickness applied everywhere except the intersection of the airways.
Figure 18:
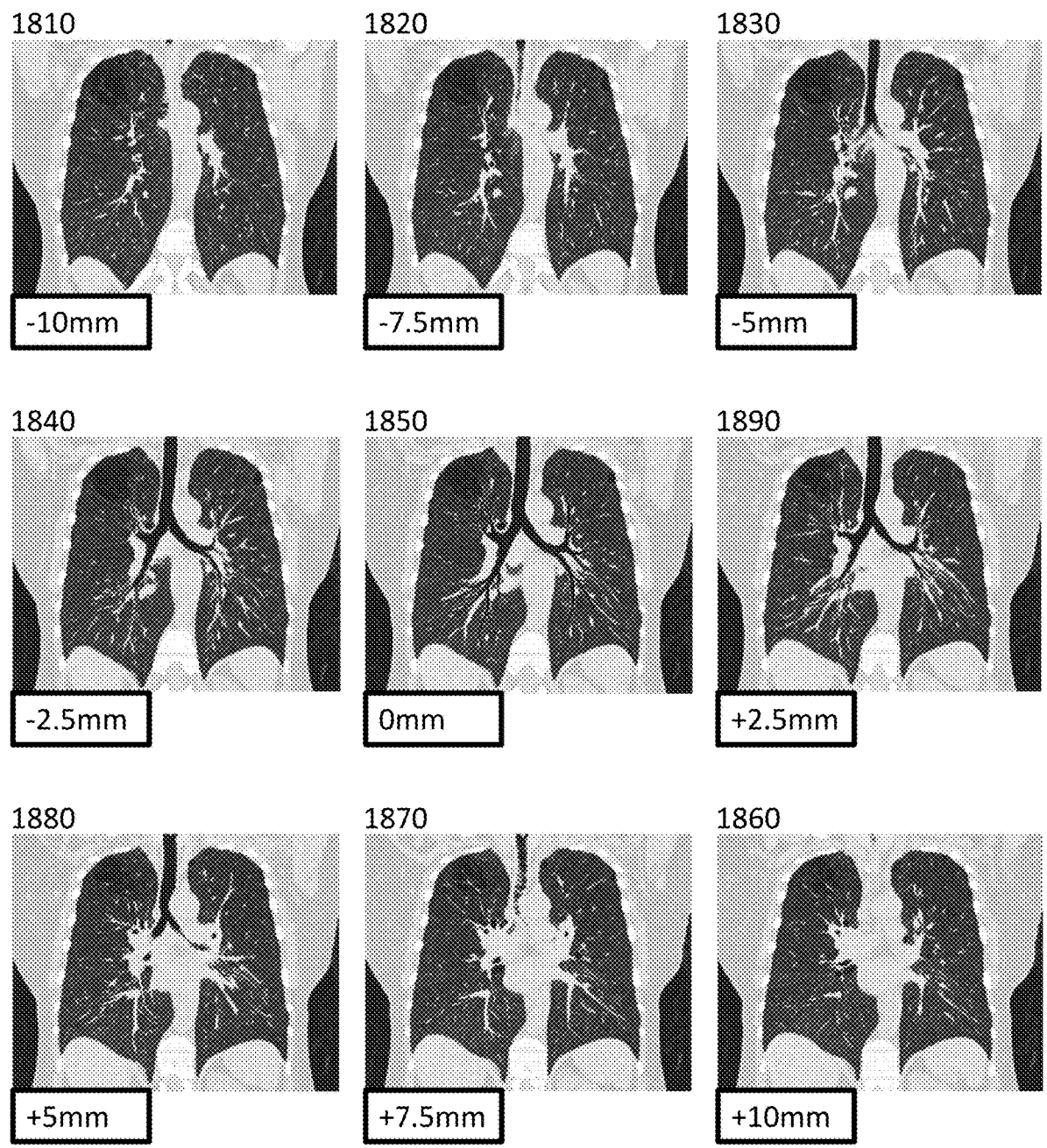
FIG. 18 shows images acquired by moving the original cut-surface forward and backward along the view direction.

FIG. 17 shows a cut-surface rendering with a set amount (e.g., 5 mm) of thickness applied everywhere except the intersection of the airways. The thickness can be rendered using a maximum intensity projection (MIP). In the example shown in FIG. 17, the thickness may help to visualize more of the high density vessels 1710 within the lungs, while keeping the context of the un-thickened airway locations 1720.

Use Case (C)

Figure 22:
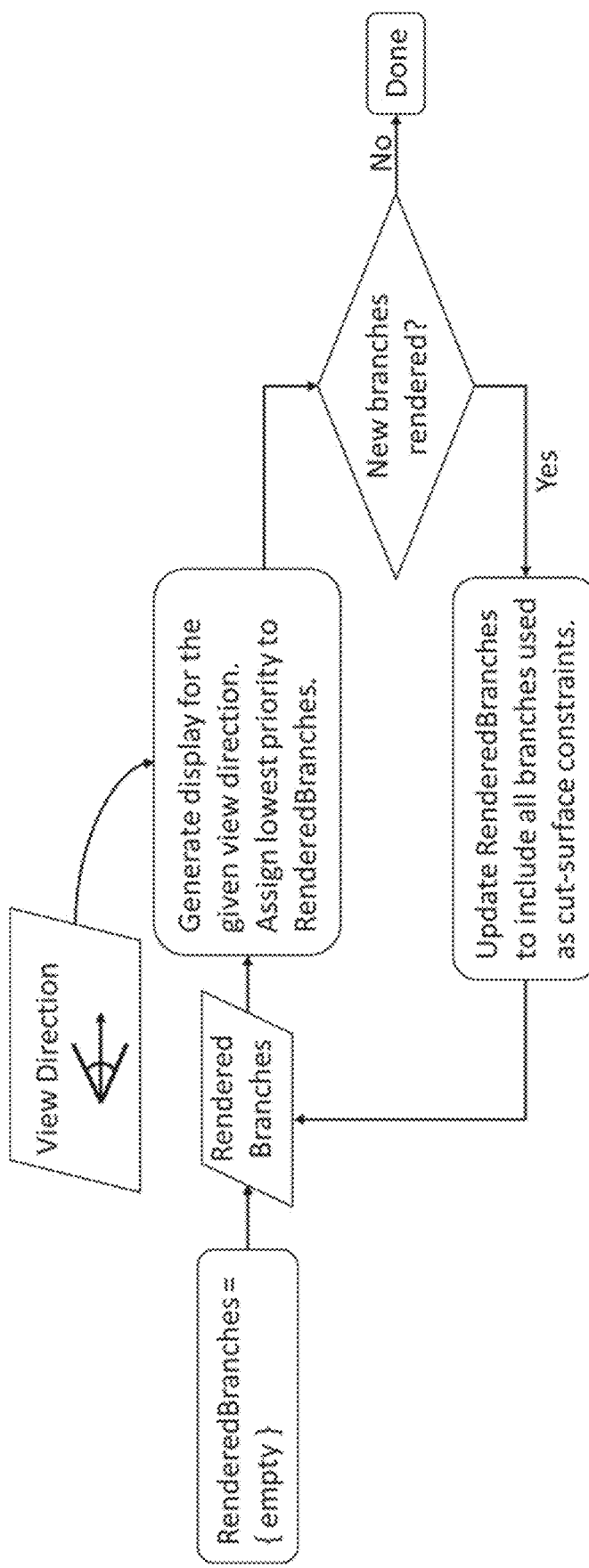
FIG. 22 shows an example process for generating multiple cut-plane renderings in order to eventually include every branch of a tree structure for a given view direction.

The viewing application could have a variety of ways to modify the surface and/or the viewpoint for rendering. For instance, a user may toggle through various pre-computed surface options that, when combined, cover the entire structure of interest. Various methods for creating such a set of surfaces are described elsewhere herein as an iteration in which the surface at each step is created based on the structure of interest minus all portions of the structure covered by previous iterations, for example, as shown in FIG. 22. FIG. 22 shows an example process for generating multiple cut-plane renderings in order to eventually include every branch of a tree structure for a given view direction.

Figure 21:
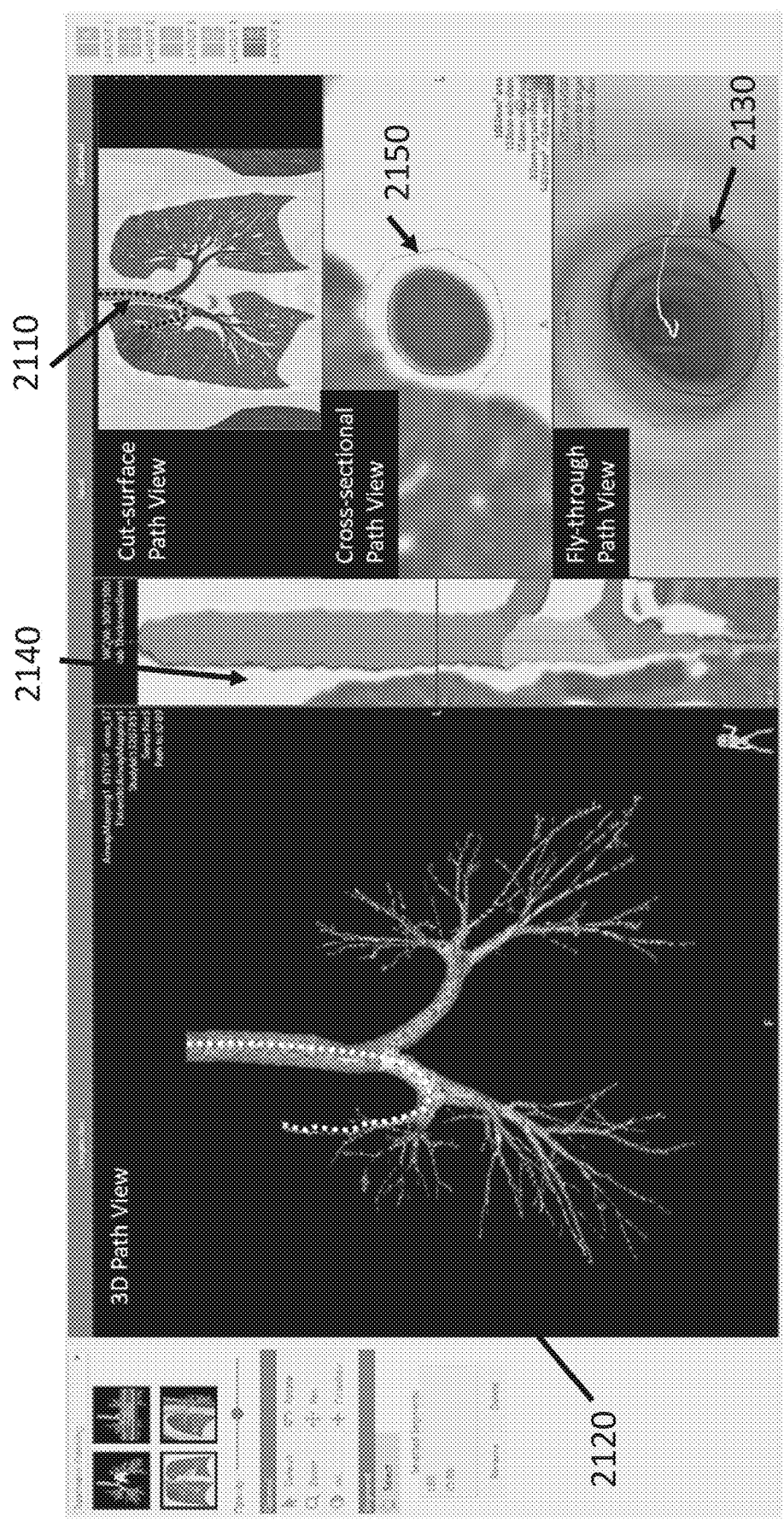
FIG. 21 shows various views of a bronchoscopic path that may be used to plan a procedure.

Additionally or alternatively, the user may manually select some subset of the original structure of interest that is desired for simultaneous display. In the case of an airway tree, this might be accomplished by choosing individual branches of interest or by selecting one or more auxiliary regions (disease sites, abnormalities, etc.) so that the surface favors intersection with parts of the structure of interest closest to the defined region(s). For instance, if a bronchoscopic procedure is being planned, the user could indicate the path through the airway tree that is the intended route for the procedure. A cut-surface display could be optimized for that particular path and displayed to the user with the path highlighted, for example, such as shown in FIG. 21. FIG. 21 shows various views of a bronchoscopic path that may be used to plan a procedure, including the cut-surface view 2110, shown in the upper-right corner.

In some examples, rather than receiving the surface constraint locations from the user, the display could be synched to a positioning device to track the location of a medical device (such as a bronchoscopic or vascular catheter) during a live procedure. Aside from only modifying the surface used for display, the application may also provide mechanisms for adjusting the viewpoint by which the surface is defined and from which the display is rendered. For instance, the user may alter the viewpoint via a rotational manipulation to orient the view to a particular perspective of the structure of interest. As soon as the viewpoint is adjusted, the surface used for display could be recalculated based on the new vantage point. The viewpoint manipulation could be performed in connection with an auxiliary display (e.g. a 3D view or an adjustable oblique plane MPR), with the surface display updating accordingly as the user modifies the 3D view, for example, as shown in FIG. 19. FIG. 19 shows a cut-surface display (right), optimized for the view shown in the auxiliary display (left). The top row shows a cut-surface rendering 1920 and a corresponding 3D display 1910 for a coronal viewpoint. The bottom row shows a cut-surface rendering 1940 and a corresponding 3D display 1930 after rotating 45 degrees around the vertical axis.

In some examples, the surface-view display itself could have a manipulatable interface and the user could directly modify the viewpoint according to what is being displayed and updated interactively on the surface view. As in the medical device synchronization described previously, the live anatomical location could also be used to modify and update the viewpoint (and subsequently the surface) to an ideal virtual position from which to observe the structure of interest at that point.

Use Case (D)

Figure 20:
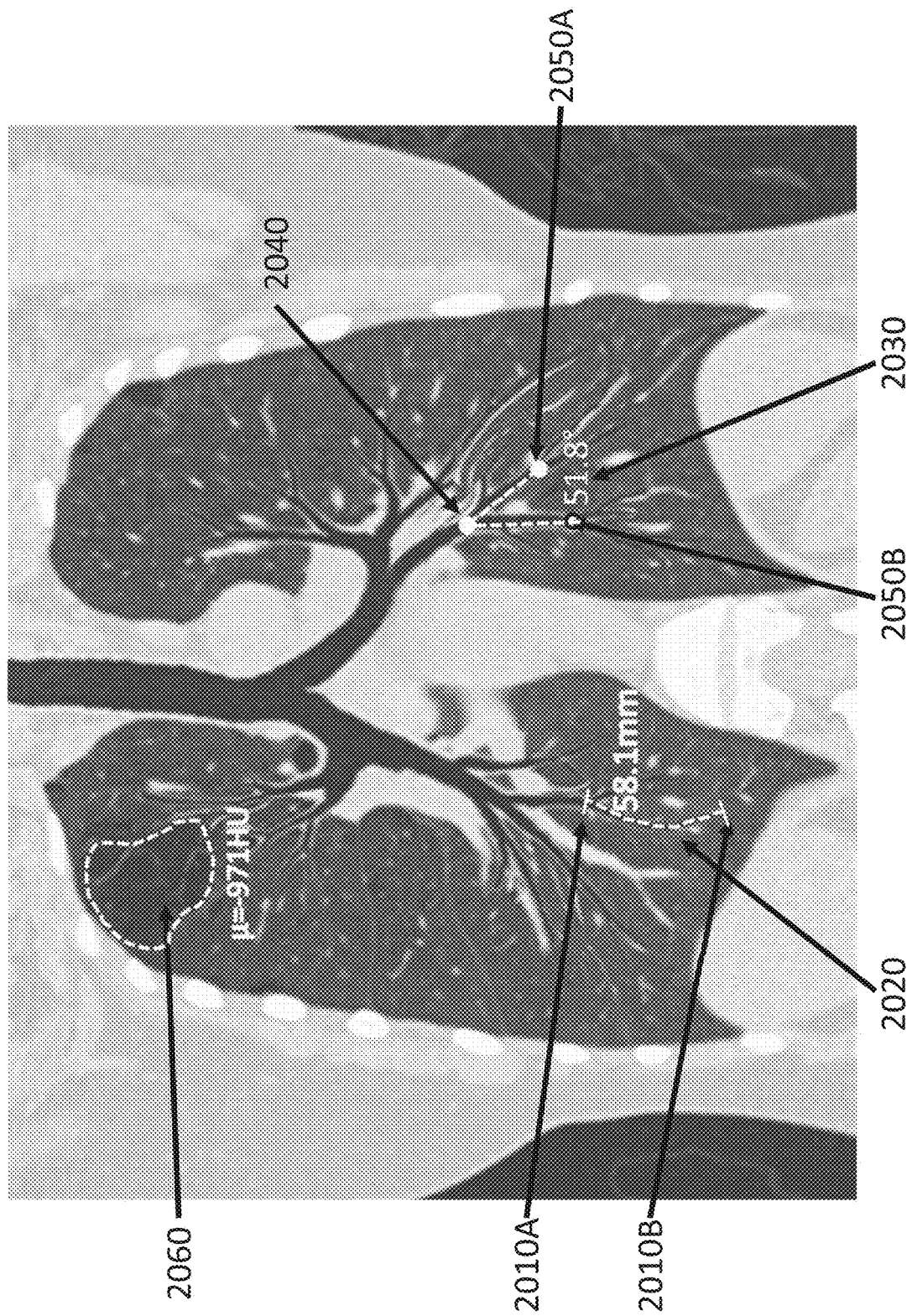
FIG. 20 shows a cut-surface display with annotations.

In some examples, various measurements can be defined and calculated on the display image, for example, using known relationships between locations on the cut-surface display and sections in the volumetric data. For instance, a ruler tool that measures the real distance between two point locations could be enabled on the cut-surface display. By drawing the straight-line ruler on the image, the user could define two unique 3D endpoints in the volume. The resulting 3D distance between those two 3D endpoints could be displayed next to the ruler to indicate the actual measurement. Similarly, an angle measurement tool could be implemented for measuring the angle defined by three points. Furthermore, because of the homeomorphic relationship between the 2D image display and the 3D surface, any 2D region that can be defined on the 2D image will correspond to a well-defined, enclosed region on the 3D surface. This means that region measurements such as area or image intensity statistics of the 3D surface can be computed and displayed, for example, as shown in FIG. 20. FIG. 20 shows a cut-surface display with example drawn measurements for length, such as length 2020, as the 3D distance between the two endpoints of a centerline 2010A and 2010B through a branch. Bifurcation angle 2030 is also shown and represents the 3D angle formed between the endpoints of two child branches 2050A and 2050B with respect to the bifurcation point 2040 at which they diverge. Additionally, the average HU value across all 3D voxels represented within a 2D region may be shown. For example, the average HU value of region 2060 is shown as −971HU.

Use Case (E)

Figure 23:
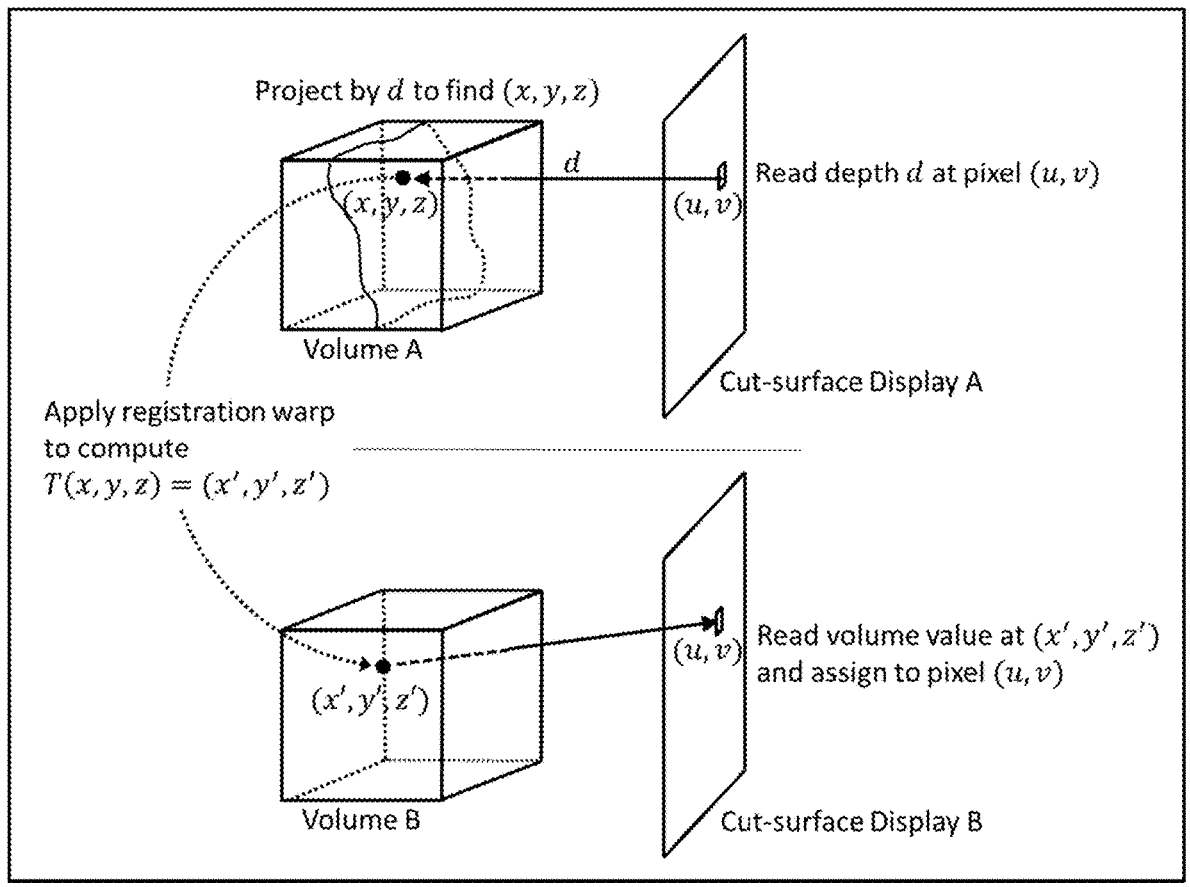
FIG. 23 shows an embodiment of a mapping scheme that could be used to compute equivalent cut-surface display images for two co-registered image volumes.

In some examples, when two or more scan volumes are being analyzed, the cut-surface display can be used to simultaneously represent a rich amount of information of their comparison. If a diffeomorphic correspondence among the two or more scans is established (for instance, via automatic image registration techniques), then an appropriate transformation sequence can be defined to generate equivalent cut-surface displays, such as shown in FIG. 23. FIG. 23 shows an embodiment of a mapping scheme that could be used to compute equivalent cut-surface display images (Cut-surface Display A and Cut-surface Display B) for two co-registered image volumes (Volume A and Volume B). In some embodiments, this can be performed with the assumption that the co-registration is capable of mapping every 3D point (x,y,z) in Volume A to a 3D point T(x,y,z) in Volume B.

In some such examples, the resulting displays can represent the same anatomical localities, and could be rendered side-by-side or overlaid directly on top of one another with an adjustable weight or transparency function. Any of the manipulations described above could be translated to analogous manipulations in the views of the various other volumes.

It will be appreciated that various concepts described with respect to the use cases listed herein may be combined in various embodiments.

Various features have been described. Some aspects of the disclosure are listed below, and can be combined in a variety of ways according to different embodiments.

For a given structure of interest within a 3D image volume, defining a vantage point and an associated surface (homeomorphic to an image plane) intersecting all or some portion of the structure of interest, rendering the surface via projection to an image plane, and producing an output image.

Defining a vantage point and an associated surface within a 3D image volume, rendering the surface via projection to an image plane, displaying the rendered image on the screen and providing one or more of the following functionalities:

One or more auxiliary views corresponding to a specified pixel location in the rendered display (e.g., Use Case (A) and FIG. 14).

Altering the displayed image by overlaying annotations, coloring, etc. (e.g., Use Case (A) and FIG. 15).

Altering the displayed image by super-imposing 3D rendering(s) of one or more other anatomical structures (e.g., Use Case (A) and FIG. 16).

Applying a specified amount of "thickness" to the surface whereby the rendering at each pixel aggregates the value across the thickened surface projection by averaging, maximum intensity, minimum intensity, or some other (e.g., Use Case (B) and FIG. 17).

Interactive adjustment of the position of the surface by moving it closer to or further from the vantage point (e.g., Use Case (B) and FIG. 18).

Interactive adjustment of the surface by any of the following (e.g., Use Case (C)):
 i. Selection of one or more specific points or regions of interest either within or near to the given structure
 ii. Selecting from one or more alternative surfaces that capture different parts of the structure of interest (FIG. 22)

Interactive adjustment of the vantage point, followed by auto-update of the surface, based on either (e.g., Use Case (C) and FIG. 19):
 i. Rotational manipulation of an auxiliary display or
 ii. Direct rotational manipulation on the cut-surface display Automatic adjustment of the vantage point, followed by auto-update of the surface based on an anatomical location provided (e.g., Use Case (C)):
 i. An anatomical location provided directly by the user or via correspondence with an auxiliary scan or device (e.g. a surgical GPS unit)

ii. A 3D path through the structure of interest—for example, a proposed airway path for planning a bronchoscopic procedure (e.g., Use Case (C) and FIG. 21). Multiple representations of an airway path of interest are shown in different viewing paradigms. A 3D view of the entire airway tree with the airway path superimposed as a white dotted line is shown on display 2120. A cut-surface view with the airway path superimposed as a white dotted line is shown on display 2110. A cross-sectional view (in a plane perpendicular to a particular location along the centerline path) with approximate inner and outer airway wall contours is shown in in display 2150. Additionally, a 3D fly-through perspective from inside the airway is shown in display 2130.

Measurement for distances, angles, areas, etc. that correctly adjust and account for any distortion in the displayed image (e.g., Use Case (D) and FIG. 20).

Synching the viewpoint and surface between two co-registered volume spaces and viewing both displays simultaneously (either side-by-side or directly overlaid on top of one another with an adjustable weight or transparency function to smoothly switch from one to the other (e.g., Use Case (E) and FIG. 23).

Various features described herein, and various combinations thereof, can result in improvements and advantages over existing systems and methods. For instance, various features described herein and/or combinations thereof can be configured to a. Show full volumetric context, as opposed to an exterior-only shape-based 3D model view.
b. Demonstrate various characteristics (such as vessel or airway tapering) across many non-co-planar branches simultaneously.
c. Show anatomy out to the end of every tubular branch displayed.
d. Capture significantly more of the object of interest than a planar cross-section.
e. Preserve orientation and global spatial context better than traditional curved planar reformat images.
f. Maintain resolution and integrity of the source data (e.g., using no averaging or filtering as in the case of a thickened MPR or MIP or MinIP rendering).
g. Guarantee a one-to-one and continuous correspondence (in both directions) between the cut-surface in 3D and the rendered image in 2D—a property missing from intensity projection, as well as most curved MPR and filet view methods. This mathematical relationship has many benefits in that it is easy and natural to map back and forth between the 3D and the 2D representations.
h. Work for objects of arbitrary complexity (unlike [1]) by limiting the display to a feasible subset of the structure of interest.
i. Be constructed variably (in terms of view direction and cut-surface definition) to optimize according to the specific information of interest.

Below is a non-limiting list of potential uses and implementations of systems and methods as described herein:

Static and interactive visualization of tubular anatomical structures in medical images including airway trees, vascular trees, large/small bowel centerlines.

An alternative display for a broad spectrum of CT angiography (CTA) and MR angiography (MRA) analyses, including head/neck vessels, arm/hand vessels, as well as thoracic and abdominal aorta and associated proximal arterial branches (celiac, mesenteric, etc.) and distal arterial branches (iliac, femoral, renal, popliteal, etc.).

Visualization of manifold-like anatomical structures, such as the diaphragm muscle, curved bony surfaces, and curved hyaline and fibrocartilage structures in the shoulders, hips, knees, and ankles.

Visualization of the biliary and pancreatic ducts in CT, MR, or magnetic resonance cholangiopancreatography scans.

Mapping multiple sections of a solid organ into a single view, such as brain lobes, lung lobes, heart chambers, and liver lobes.

Visualization of complex organic sub-systems, such as kidneys/ureters/bladder, or vagina/uterus/fallopian tubes/ovaries, or prostate/seminal vesicles/vas deferens/testicles in a single display.

Assessment of disease state within and outside of the anatomical structures listed above, especially localization and spatial relationship to other structures or characteristics. For instance, any of the following:
  i. bronchiectasis in the lung airways
  ii. mucous plugging in the lung airways
  iii. airway wall inflammation/thickening
  iv. airway loss/remodeling in COPD
  v. spatial relationships between airway various characteristics and the condition of surrounding parenchyma
  vi. airway occlusions or narrowing
  vii. airway diverticulum
  viii. lung cancer nodules in relation to surrounding airways
  ix. pulmonary emboli
  x. vascular stenosis
  xi. vascular aneurysm
  xii. vascular calcification/plaque
  xiii. vessel wall abnormalities
  xiv. large/small bowel diverticulum
  xv. colonic polyps
  xvi. tumors in relation to surrounding vasculature Surgical and endoscopic procedural planning.

Intra-operative and intra-procedural assistance (live adjustment of the cut-plane image based on the location of a medical device).

Various methods described herein can be implemented in a local and/or distributed system. Systems can include a memory for storing volumetric data, such as CT or MM data, and a processor configured to process such volumetric data according to methods described herein. In some examples, systems can be embodied as a stand-alone computer. Additionally or alternatively, various processes can be performed in a remote location, such as via cloud computing or other remote processing configurations. For instance, in some examples, data (e.g., volumetric data) can be communicated from an initial to a remote location for processing, and resulting images (e.g., cut-surface display images) can be communicated back to the initial location. Systems can include a user interface to allow a user to adjust and/or select one or more aspects associated with performing various processes described herein.

Various non-limiting examples have been described. These and others are within the scope of the following claims.

The invention claimed is:

1. A method for visualizing a tubular object of interest from a set of volumetric data comprising:
    determining a viewing direction for the tubular object;
    selecting a constraint subset of the tubular object within a set of volumetric data;
    defining a cut-surface through the volumetric data, the cut-surface comprising a three-dimensional surface within the volumetric data and including the constraint subset of the tubular object within the volumetric data such that the cut-surface intersects the constraint subset of the tubular object; and rendering an image based upon the determined viewing direction and the volumetric data of the tubular object along the intersection of the volumetric data and the defined cut-surface.

2. The method of claim 1, wherein the volumetric data comprise CT or MRI data.

3. The method of claim 1, wherein the determining the viewing direction comprises:
implementing a predefined setting;
receiving a selection of a viewing direction; or
calculating an optimal viewing direction.

4. The method of claim 3, wherein receiving a selection of a viewing direction comprises providing a rotatable two-dimensional visualization of the volumetric data and receiving a selected orientation based on a rotated position of the rotatable two-dimensional visualization.

5. The method of claim 4, wherein the rotatable two-dimensional visualization comprises an oblique MPR, a 2D maximum intensity projection (MIP) or a 2D minimum intensity projection (MinIP).

6. The method of claim 3, wherein receiving a selection of a viewing direction comprises providing a rotatable three-dimensional visualization of the volumetric data and receiving a selected orientation based on a rotated position of the rotatable three-dimensional visualization.

7. The method of claim 6, wherein the rotatable three-dimensional visualization comprises a maximum intensity projection (MIP) or a minimum intensity projection (MinIP).

8. The method of claim 3, further comprising receiving information representative of the orientation of an external medical device and/or planning system and wherein determining the viewing direction is based upon the received information.

9. The method of claim 3, wherein calculating an optimal viewing direction comprises:
calculating a weighted average of a plurality of bifurcation normal vectors, each of the plurality of bifurcation normal vectors being associated with a different identified bifurcation in the tubular object.

10. The method of claim 3, wherein calculating an optimal viewing direction comprises performing a principal component analysis of the tubular object in the volumetric data.

11. The method of claim 1, wherein identifying constraints in the volumetric data comprises selecting a plurality of points within the tubular object; and wherein defining a cut-surface throughout the volumetric data comprises interpolating between and/or extrapolating from the selected plurality of points.

12. The method of claim 11, wherein the selected plurality of points within the tubular object correspond to selected one or more branches of the tubular object.

13. The method of claim 12, wherein selecting one or more branches comprises:
prioritizing the branches of the tubular object; and
selecting branches in descending order of priority and excluding branches having a centerline that passes in front of or behind a centerline of a branch that has been previously selected.

14. The method of claim 13, further comprising assigning a score to each branch, the score corresponding to the sum of its length and the length of its descendant branches when projected onto a plane normal to the determined viewing direction, and wherein branches are prioritized according to the assigned score.

15. The method of claim 13, wherein branches are prioritized according to distance from the branch to one or more locations of interest in the volumetric data.

16. The method of claim 15, wherein branches are prioritized from lowest distance to highest distance.

17. The method of claim 13, further comprising:
comparing the volumetric data of the tubular object to volumetric data of the tubular object taken at a previous time; and
determining, for a plurality of regions in the volumetric data, an amount of change in the volumetric data from the previous time; and wherein
branches are prioritized according to an amount of change in the volumetric data from the previous time.

18. The method of claim 1, further comprising:
determining, for a plurality of regions in the rendered image, an amount of distortion present in the image due to the cut-surface; and
generating a display showing the amount of distortion present at a plurality of locations within the rendered image.

19. The method of claim 1, further comprising:
changing the viewing direction of the tubular object to an updated viewing direction;
updating the cut-surface through the volumetric data based on the constraint subset and the updated viewing direction; and
rendering an updated image based upon the updated viewing direction and the volumetric data of the tubular object along the intersection of the volumetric data and the updated cut-surface.

20. A method for visualizing a tubular object of interest from a set of volumetric data comprising:
identifying a plurality of bifurcations in the tubular object;
assigning a weighting factor to each of the identified bifurcations;
determining a bifurcation normal vector associated with each of the plurality of bifurcations;
determining a weighted average of the bifurcation normal vectors based on the weighting factors and determined bifurcation normal vectors for each of the plurality of identified bifurcations; and
rendering an image of the volumetric data from a perspective parallel to the weighted average of the bifurcation normal vectors.

21. The method of claim 20, wherein the weighting factor associated with a given bifurcation is related to the number of bifurcations preceding the given bifurcation, and wherein bifurcations with fewer preceding bifurcations are given a stronger weight than bifurcations with more preceding bifurcations.

22. The method of claim 20, further comprising identifying one or more points of interest within the volume, and wherein the weighting factor associated with a given bifurcations is based on a distance metric between the given bifurcation and the one or more of the points of interest.

23. The method of claim 22, wherein the distance metric between the given bifurcation and the one or more points of interest corresponds to a minimum distance of the distances between the bifurcation and each of the one or more points of interest.

24. The method of claim 20, further comprising:
defining a cut-surface throughout volumetric data; and wherein
the rendering the image of the volumetric data comprises rendering an image of the intersection of the cut-surface and the tubular object.

* * * * *